(12) United States Patent
Ohta et al.

(10) Patent No.: US 9,100,875 B2
(45) Date of Patent: *Aug. 4, 2015

(54) BASE STATION, MOBILE STATION, COMMUNICATION SYSTEM, TRANSMISSION METHOD AND REORDERING METHOD

(71) Applicant: FUJITSU LIMITED, Kawasaki-shi, Kanagawa (JP)

(72) Inventors: Yoshiaki Ohta, Kawasaki (JP); Yoshiharu Tajima, Kawasaki (JP); Kazuhisa Obuchi, Kawasaki (JP); Yoshihiro Kawasaki, Kawasaki (JP); Yoshinori Tanaka, Kawasaki (JP); Katsumasa Sugiyama, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 155 days.

This patent is subject to a terminal disclaimer.

(21) Appl. No.: 13/896,055

(22) Filed: May 16, 2013

(65) Prior Publication Data

US 2013/0250915 A1    Sep. 26, 2013

Related U.S. Application Data

(60) Division of application No. 12/603,125, filed on Oct. 21, 2009, which is a continuation of application No. PCT/JP2007/059037, filed on Apr. 26, 2007.

(51) Int. Cl.
*H04W 4/00* (2009.01)
*H04W 36/00* (2009.01)
(Continued)

(52) U.S. Cl.
CPC ........... *H04W 36/0005* (2013.01); *H04L 47/10* (2013.01); *H04L 47/14* (2013.01); *H04L 47/34* (2013.01); *H04L 49/9057* (2013.01); *H04W 36/02* (2013.01); *H04W 36/023* (2013.01)

(58) Field of Classification Search
None
See application file for complete search history.

(56) References Cited

U.S. PATENT DOCUMENTS 5,940,371 A    8/1999  Mitts et al.
8,830,950 B2 *  9/2014  Meylan ......................... 370/331
(Continued)

FOREIGN PATENT DOCUMENTS

CN    1669350       9/2005
CN    1669350 A     9/2005
(Continued)

OTHER PUBLICATIONS

Extended European search report issued for corresponding European Patent Application No. 07742472.9, dated Jun. 13, 2013.
(Continued)

*Primary Examiner* — Michael J Moore, Jr.
(74) *Attorney, Agent, or Firm* — Myers Wolin, LLC

(57) ABSTRACT

A reordering method of sending packets, to which numbers indicating the packet order are added, to a mobile station from a base station, and rearranging the order of the packets at the mobile station, this includes forwarding from a source base station to a target base station, packets, not sent to the mobile station before a handover sequence, or packets, a confirmation response of proper reception has not been received from the mobile station, transmitting preferentially those packets from the target base station to the mobile base station and then transmitting packets received from a host station to the mobile station, giving packets information indicating that the packets are jump packets when transmitting the packets to the mobile station, received from the host station with the order jumped, deciding jump packets are not objects of reordering, and performing the reordering process for packets that are objects of reordering.

4 Claims, 25 Drawing Sheets

(51) Int. Cl.
*H04L 12/801* (2013.01)
*H04W 36/02* (2009.01)
*H04L 12/861* (2013.01)

(56) References Cited

U.S. PATENT DOCUMENTS

| | | |
|---|---|---|
| 2003/0007490 A1 | 1/2003 | Yi et al. |
| 2003/0008653 A1 | 1/2003 | Jiang |
| 2003/0153309 A1 | 8/2003 | Bjelland et al. |
| 2006/0072504 A1 | 4/2006 | Hu |
| 2006/0274694 A1 | 12/2006 | Rajkumar et al. |
| 2007/0041382 A1 | 2/2007 | Vayanos et al. |
| 2007/0291695 A1 | 12/2007 | Sammour et al. |
| 2008/0037548 A1 | 2/2008 | Yi et al. |
| 2008/0268907 A1 | 10/2008 | Senarath et al. |
| 2009/0245201 A1* | 10/2009 | Motegi et al. .......... 370/331 |
| 2010/0046472 A1* | 2/2010 | Chun et al. .......... 370/331 |
| 2010/0227614 A1* | 9/2010 | Chun et al. .......... 455/436 |

FOREIGN PATENT DOCUMENTS

| | | |
|---|---|---|
| EP | 1059823 | 12/2000 |
| EP | 1 545 143 | 6/2005 |
| EP | 1545143 A1 | 6/2005 |
| JP | 2004-282652 | 10/2004 |
| JP | 2006-5949 A | 1/2006 |
| JP | 2007-006230 | 1/2007 |
| JP | 2007-6230 A | 1/2007 |
| JP | 2007-266775 | 10/2007 |
| WO | 2004/042993 | 5/2004 |
| WO | 2005/125125 | 12/2005 |
| WO | 2006/130354 | 12/2006 |
| WO | 2006/135185 A2 | 12/2006 |

OTHER PUBLICATIONS

Non-Final Office Action issued by the United States Patent and Trademark Office for corresponding U.S. Appl. No. 12/603,125, electronically delivered on Aug. 12, 2013.
Pretrial report issued for corresponding Japanese Patent Application No. 2013-000038, issued on Aug. 29, 2014, with an English translation.
Qualcomm Europe, "LTE RLC Sequence Numbering", Agenda Item: 6.4, Mar. 27-31, 2006, R2-061040, 3GPP TSG-RAN WG2 meeting #52, 3GPP (3rd Generation Partnership Project), Athens, Greece.
Notification of Reason for Refusal issued for corresponding Japanese patent application No. 2013-000037, dispatched Sep. 24, 2013, with English translation.
NEC; "Lower PDCP layer for Mobility"; Agenda Item: 11.4.1 Intra RAT Handover procedures; TSG-RAN Working Group 2 #53; R2-061344; Shanghai, China; May 8-12, 2006.
Final Office Action issued by the United States Patent and Trademark Office for corresponding U.S. Appl. No. 13/430,207, electronically delivered Feb. 25, 2014.
First Notification of Office Action issued by The State Intellectual Property Office of China for corresponding application No. 200780052592.X dated Jan. 11, 2012 with Text of the First Office ACtion and English Translation attached.
International Search Report for the corresponding Patent Application No. PCT/JP2007/059037, mailed Jun. 26, 2007.
3GPP TS 36.300 V8.0.0 (Mar. 2007); 3rd Generation Partnership Project; Technical Specification Group Radio Access Network; "Evolved Universal Terrestrial Radio Access (E-UTRA) and Evolved Universal Terrestrial Radio Access Network (E-UTRAN)"; Overall description; Stage 2; (Release 8); Dated Mar. 2007.
Samsung; "Method to release resources at source ENB during handover"; Agenda Item: 12.15.1; Document for: Discussion; 3GPP TSG-RAN WG #53 meeting; R3-061032; Tallinn, Estonia, Aug. 28-Sep. 1, 2006.

3GPP TR 25.913 V7.3.0 (Mar. 2006); 3rd Generation Partnership Project; Technical Specification Group Radio Access Network; "Requirements for Evolved Utra (E-UTRA) and Evolved UTRAN (E-UTRAN)"; (Release 7); Dated Mar. 2006.
Korean Intellectual Property Office "Notice of Preliminary Rejection" issued for corresponding Korean Patent Application No. 10-2011-7018967, Mailed Oct. 4, 2011. English translation attached.
Patent Office of the Russian Federation "Office Action" issued for corresponding Russian Patent Application No. 2009143674, dated May 17, 2011. English translation attached.
Japanese Patent Office "Notification of Reasons for Refusal" issued for corresponding Japanese Patent Application No. 2009-512846, dispatched May 10, 2011. English translation attached.
3GPP TSG-RAN WG2; NEC; "Summary of e-mail discussion on downlink reordering during LTE handover", R2-070293; dated Jan. 15-19, 2007, Sorrento, Italy; [Ref.: JPOA dispatched May 10, 2011].
3GPP TSG-RAN2 #53; NTT DoCoMo, Inc.; "In-sequence data delivery for SAE Bearer Service", R2-061265; dated May 8-12, 2006, Shanghai, China; [Ref.: JPOA dispatched May 10, 2011].
Korean Intellectual Property Office "Notice of Preliminary Rejection" issued for corresponding Korean Patent Application No. 10-2009-7019135, mailed Feb. 14, 2011. English translation attached.
2nd Notification of Office Action issued for corresponding Chinese Patent Application No. 200780052592.X, issued Dec. 26, 2012, with English translation.
Samsung; "Selective forwarding/retransmission during HO"; Agenda Item: 5.2.6; R2-070130; Jan. 15-19, 2007; 3GPP TSG-RAN2 Meeting #56bis; Sorrento, Italy.
Ericsson; "X2 Interface, stage 2 description"; Agenda Item: 13.8.2.5; R3-061780; Nov. 6-10, 2006; 3GPP TSG-RAN WG3 #54; Riga, Latvia.
Notification of Reason for Refusal issued for corresponding Japanese Patent Application No. 2012-152472, dispatched Mar. 12, 2013 with English translation.
CWTS/Huawei, "IuNB: a new Interface for the direct communication between NodeBs", Jan. 14-18, 2002, R3-013224, TSG-RAN WG3 Meeting #26, Voesendorf, Austria.
Notification of Reason for Refusal issued for corresponding Japanese Patent Application No. 2012-052406, dispatched Mar. 12, 2013 with English translation.
Non-Final Office Action issued by the United States Patent and Trademark Office for corresponding U.S. Appl. No. 12/603,125, dated Jan. 18, 2013.
Notification of Reason for Refusal issued for corresponding Japanese Application No. 2011-152472 dispatched on Aug. 7, 2012 with English translation.
Notification of Reasons for Refusal issued for corresponding Japanese Application No. 2011-152472, dispatched Nov. 6, 2012, with English translation.
Non-Final Office Action issued by the United States Patent and Trademark Office for corresponding U.S. Appl. No. 13/430,207, electronically delivered Aug. 8, 2013.
Notification of Reason for Refusal issued for corresponding Japanese patent application No. 2013-000040, dispatched Sep. 24, 2013, with English translation.
NEC (email rapporteur); "Summary of email discussion on downlink reordering during LTE handover"; Agenda Item: 05.2.6—Point 8: downink packet handling at handover (forwarding, re-ordering, synchronisation); 3GPP TSG-RAN WG2; R2-070293; Sorrento, Italy; Jan. 15-19, 2007.
NTT DoCoMo; "DL forwarding and reordering"; Agenda Item: 7.3; 3GPP TSG-RAN3#55bis; R3-070539; St. Julian's, Malta; Mar. 27-30, 2007.
Notification issued by the Patent Office of the Russian Federation for corresponding Patent Application No. 2012140758, mailed on Nov. 25, 2013, with English translation.
Office Action issued for corresponding Canadian Patent Application No. 2,684,838, dated Jan. 16, 2014.
Final Office Action issued by the United States Patent and Trademark Office for corresponding U.S. Appl. No. 12/603,125, electronically delivered on Mar. 7, 2014.

(56) References Cited

OTHER PUBLICATIONS

Decision of Refusal issued for corresponding Japanese Patent Application No. 2013-000038, dispatched on Apr. 1, 2014, with an English translation.
CWTS/Huawei, "Synchronization of active cells based on direct NodeB interconnections", Jan. 14-18, 2002, TSG-RAN WG3 Meeting #26, R3-020114, 3GPP, Voesendorf.
NEC, "Reordering of downlink RLC SDUs during handovers", Jun. 27-30, 2006, Agenda Item: 11. Radio mobility procedures, TSG-RAN WG2 #53bis, R2-061967, 3GPP, Cannes, France.
Notification of Reason for Refusal issued for corresponding Japanese Patent Application No. 2012-052406, dispatched on Aug. 7, 2013, with English translation.
Notification of Reason for Refusal issued for corresponding Japanese patent application No. 2013-000039, dispatched Sep. 24, 2013, with English translation.
Notification of Reason for Refusal issued for corresponding Japanese patent application No. 2013-000038, dispatched Sep. 24, 2013, with English translation.
Notification of Refusal issued for corresponding Japanese Patent Application No. 2013-000040, dispatched on Apr. 1, 2014, with an English translation.
First Notification of Office Action issued for corresponding Chinese Patent Application No. 201210251351.0, issued Jun. 25, 2014, with an English translation.
NTT DoCoMo, Inc., "In-sequence data delivery for SAE Bearer Service", Agenda Item: 11.4.1 LTE—Handover procedures (intra-RAT), R2-061265, May 8-12, 2006, 3GPP TSG-RAN2 #53, Shanghai, China.
NTT DoCoMo, Inc., "UE PDCP reordering at inter eNB handover", Agenda Item: 11.92 Radio mobility procedures intra-LTE, R2-062170, Aug. 28-Sep. 1, 2006, 3GPP TSG-RAN WG2 Meeting #54, Tallinn, Estonia.
The extended European search report and the European search opinion issued for corresponding European Patent Application No. 12171707.8, dated Jun. 13, 2013.
Non-Final Office Action issued by the United States Patent and Trademark Office for corresponding U.S. Appl. No. 12/603,125, electronically delivered on Sep. 8, 2014.
Notification of Reason for Refusal issued for corresponding Japanese patent application No. 2013-000041, dispatched Sep. 24, 2013, with English translation.
First Notification of Office Action issued for corresponding Chinese Patent Application No. 201210251345.5, issued on May 5, 2014, with an English translation.
NEC, "S1X2 Sequence Number based Reordering", Agenda Item: 11-Radio mobility procedures, Jun. 27-30, 2006, R2-061968, 3GPP TSG-RAN Working Group 2 #53bis, Cannes, France.
First Notification of Office Action issued for corresponding Chinese Patent Application No. 201210259423.6, issued on Apr. 21, 2014, with an English translation.
LG Electronics, "In-sequence Delivery support for handover", Agenda Item: 11.4.1, May 8-12, 2006, R2-061363, 3GPP TSG-RAN Working Group 2 #53, Shanghai, China.
NEC, "S1X2 Sequence Number Based Reordering", Agenda Item: 11.9.2, Aug. 28-Sep. 1, 2006, R2-062284, 3GPP TSG-RAN Working Group 2 #54, Tallinn, Estonia.
First Examination Report issued for corresponding Indian Patent Application No. 3705/KOLNP/2009 dated Oct. 31, 2014.
Office Action issued for corresponding Japanese Patent Application No. 2013-000040 dated Nov. 11, 2014 with an English translation.
Nokia, "S1 User Plane protocol requirements", Agenda Item: 12.15.2, 3GPP TSG-RAN WG3 Meeting #52, R3-060653, 3GPP, Shanghai, China, May 8-12, 2006.
Fujitsu, "Handling re-ordering in LTE during Handover", Agenda Item: 7.3, 3GPP TSG RAN WG3 Meeting #55-bis, R3-070666, Malta, Mar. 27-31, 2007.
Fujitsu, "Handling re-ordering in LTE during Handover", Agenda Item: 7.3, 3GPP TSG RAN WG3 Meeting #55-bis, R3-070681, Malta, Mar. 27-31, 2007.
Office Action issued for corresponding Japanese Patent Application No. 2013-000041 dated Nov. 11, 2014 with an English translation.
Second Notification of Office Action issued for corresponding Chinese Patent Application No. 201210122459.X dated Nov. 15, 2014 with an English translation.
Non-Final Office Action issued by the United States Patent and Trademark Office for corresponding U.S. Appl. No. 13/896,032 electronically delivered on Dec. 15, 2014.
Non-Final Office Action issued by the United States Patent and Trademark Office for corresponding U.S. Appl. No. 13/896,049 electronically delivered on Dec. 18, 2014.
Second Notification of Office Action issued for corresponding Chinese Patent Application No. 201210259423.6, issued Oct. 14, 2014, with an English translation.
Notification of Refusal issued for corresponding Japanese Patent Application No. 2013-000041, dispatched on Apr. 1, 2014, with an English translation.
Non-Final Office Action issued by the United States Patent and Trademark Office for corresponding U.S. Appl. No. 13/894,062 electronically delivered on Dec. 5, 2014.
Non-Final Office Action issued by the United States Patent and Trademark Office for corresponding U.S. Appl. No. 13/894,766 electronically delivered on Dec. 3, 2014.
Pretrial Report issued by the Japan Patent Office for corresponding Japanese Patent Application No. JP2013-000040, mailed on Apr. 24, 2015, with an English translation.
Pretrial Report issued by the Japan Patent Office for corresponding Japanese Patent Application No. JP2013-000041, mailed on Apr. 28, 2015, with an English translation.
Ericsson, "X2 Stage 2 Description", Agenda Item: 13.8.2.5, 3GPP TSG RAN WG3 Meeting #54, R3-061928, Riga, Latvia, Nov. 6-10, 2006.
Ericsson, "X2 Stage 2 Description", Agenda Item: 13.8.2.5, 3GPP TSG RAN WG3 Meeting #54, R3-062011, Riga, Latvia, Nov. 6-10, 2006.
Ericsson, Change Request for "Handover Cancel Procedure on X2", 3GPP TSG-RAN WG3 Meeting #55bis, R3-070620, St Julian, Malta, Mar. 27-30, 2007.

* cited by examiner

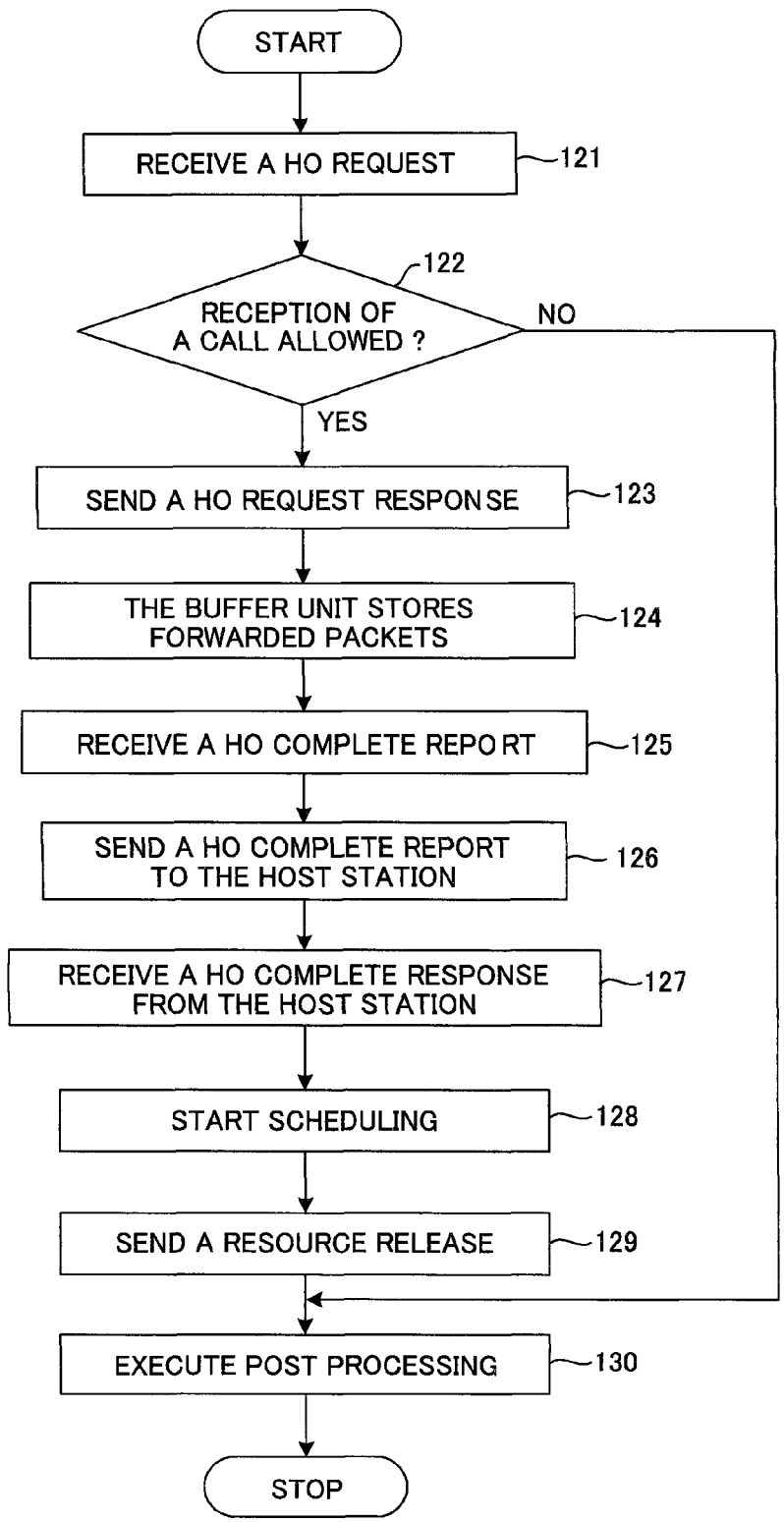

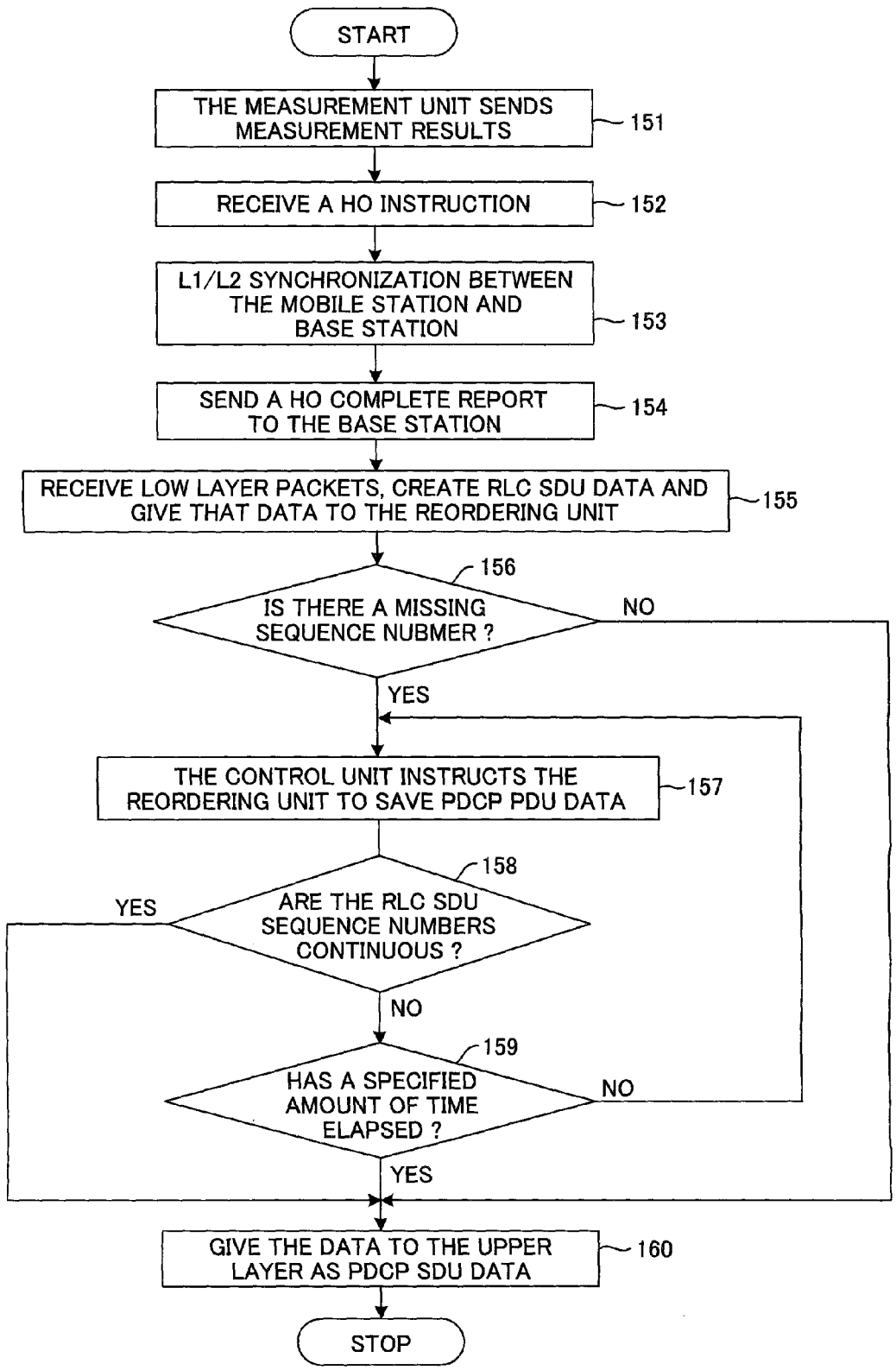

BASE STATION, MOBILE STATION, COMMUNICATION SYSTEM, TRANSMISSION METHOD AND REORDERING METHOD

CROSS REFERENCE TO RELATED APPLICATION

This application is a division of U.S. application Ser. No. 12/603,125, filed on Oct. 21, 2009, now pending, which is a continuation of PCT Application of PCT/JP2007/059037, filed on Apr. 26, 2007, the contents of each are herein wholly incorporated by reference. The present application also relates to U.S. application Ser. No. 13/430,207, filed Mar. 26, 2012, U.S. application Ser. No. 13/894,062, filed May 14, 2013 and U.S. application Ser. No. 13/894,766 filed May 15, 2013.

BACKGROUND OF THE INVENTION

The present invention relates to abase station, mobile station, communication system, transmission method and reordering method.

Currently, for mobile communication systems such as mobile telephones, third-generation type service using CDMA has begun, however, research of a next generation mobile communication system (LTE: Long Term Evolution) in which even faster communication is possible is being advanced by the 3GPP (3rd Generation Partnership Project) (refer to 3GPP, "Requirements for Evolved UTRA (E-UTRA) and Evolved UTRAN (E-UTAN), " TR25.913 V7.3.0, Release 7, March 2006). Some of the large challenges in this research include increasing the transmission rate and reducing transmission delay.

In the LTE communication system, in order to increase the transmission rate and reduce transmission delay, the handover method used is designed to be at a higher level than that of a conventional system. In a mobile communication system, when a mobile station moves during communication, the base station that the mobile station is communicating with is switched (handover) according to the reception status. Therefore, in order to perform communication at increased transmission speed and with low transmission delay, improving the level of the handover is essential. In a LTE communication system, a packet exchange system is basic, so handover is a hard handover. In a hard handover, after the line connection with the base station that the mobile station communicates with before moving is cut, a line is connected between the mobile station and a target base station. In a hard handover, by obtaining system information about the target base station immediately before performing the handover, it is possible to perform the handover in a short time; however, transmission of user data becomes interrupted during the handover.

Therefore, in order to reduce transmission delay it is important that the state of interrupted transmission be shortened and that the loss of packets while transmission is interrupted be prevented. In the case that packets do become lost while transmission is interrupted, the lost packets are recovered in end-to-end retransmission of the packets, so transmission delay becomes large.

Therefore, in a handover in a LTE communication system, a method is specified in which among data that includes control information and packets for the mobile station, the transmission of packets that have not yet been transmitted to the mobile station from the source base station is taken over by forwarding those packets to the target base station from the source base station (refer to 3GPP, "Evolved Universal Terrestrial Radio Access (E-UTRA) and Evolved Universal Terrestrial Radio Access Network (E-UTRAN)," TS36.300, Release 8, V8.0.0, April 2007).

Takeover During a Handover

FIG. 21 is a drawing explaining takeover during a handover. In (A) of FIG. 21, two base stations 1a and 1b are connected to a host station (for example a MME/SAE gateway) 2. A mobile station 4 exists within the cell 3a of the base station 1a, and is currently communicating with the base station 1a. In this state, as shown in (B) of FIG. 21, when the mobile station 4 moves in the direction toward the base station 1b and enters into the cell 3b, a handover is executed and the base station with which the mobile station 4 communicates is switched from the base station 1a to the base station 1b. Here, a base station that is in communication with a mobile station before the mobile station moves is called the source base station, and the base station that communicates with the mobile station after the mobile station moves is called the target base station.

The source base station 1a stores packets that were received from the host station 2 in an internal buffer, and sequentially sends the packets that are stored in that buffer to the mobile station 4. Therefore, when a handover occurs, the packets that are not sent to the mobile station are stored and exist in the buffer. In (B) of FIG. 21, it is necessary that before a handover, the packets n–2 to n be received and stored in the buffer without being sent to the mobile station, and that after the handover it is necessary that these packets be sent to the mobile station 4 from the target base station. Therefore, when executing the handover sequence, the source base station 1a transfers (forwards) the packets n–2 to n to the target base station 1b. By using this forwarding method, the target base station sends those packets to the mobile station 4 immediately after the handover, so no interruption in the packets occurs. Therefore, it becomes possible to execute high-speed handover without performing end-to-end retransmission of the packets. In the explanation above, n–2 to n are numbers (sequence numbers) that indicate the order of the packets.

Handover

FIG. 22 is a drawing explaining a handover in a LTE communication system, and FIG. 23 is a drawing explaining the handover procedure that is currently presumed for a LTE communication system.

Using a Measurement Report (report of the reception status of the base station 1 and other surrounding base stations), the mobile station 4 notifies the source base station 1 that a handover HO (Handover) is necessary (1. Measurement Control).

The source base station 1 decides a target base station 1b according to the contents of the Measurement Report (2. HO Decision), and sends a handover request (3. Handover Request) to that target base station 1b. At that time, the source base station 1a also sends information about the mobile station (mobile station ID, QoS (Quality of Service) information, etc.). The target base station 1b performs call-receiving control based on that information (4. Call-Receiving Control).

After allowing the acceptance of the mobile station, the target base station 1b returns a handover response to the source base station (5. HO Response). After that, the source base station 1a sends a handover instruction to the mobile station 4 (6. HO Instruction), then immediately afterwards starts taking over the data (packets) (Packet transfer: Forwarding).

The mobile station 4 receives the handover instruction, and then obtains synchronization using L1/L2 signaling (7. Synchronization), and after synchronization has been obtained, sends a handover complete report to the target base station 1b (8. HO Complete).

After this, the target base station 1b sends a handover complete report to the host station 2 (9. HO Complete). After receiving the handover complete report, the host station 2 changes the packet transmission path from the source base station 1a to the target base station 1b (10. Path Change), and returns a HO complete response to the target base station 1b (11. HO Complete Response). The target base station 1b uses a HO complete response to notify the source base station 1a that the handover HO is complete (12. Resource Release). After that, the path between the source base station 1a and the host station 2 is eliminated (13. Resource Release).

Packet Order Alignment Control

When packets are forwarded (forwarded) during execution of the handover sequence described above, there is a possibility that packets that are transferred by the target base station 1b will be jumped over by the packets that flow from the host station 2 resulting in the sequence numbers becoming mixed up. When packets are transferred from the target base station 1b to the mobile station 4 as are with the sequence numbers mixed up, the mobile station 4 is unable to receive the packets in the correct order, so the quality of communication is degraded, and as a result high-quality communication cannot be achieved just before and after a handover.

Therefore, in the LTE communication system, by using a method as described below, the base station and mobile station are capable of maintaining packet order. FIG. 24 is a drawing explaining packet order alignment wherein the target base station 1b maintains the packet order by sending packets that are transferred from the source base station 1a with higher priority than packets that are received from the host station.

In FIG. 24, before a handover, packets n−5 to n are stored in the source base station 1a, and of these packets, packets n−5 to n−2 are sent to the mobile station 4, however, packets n−1 and n are not sent to the mobile station 4. In addition, of the packets that are sent to the mobile station 4, packets n−5 and n−3 are not rightly received by the mobile station 4 (NACK), and packets n−4 and n−2 are rightly received (ACK). Therefore, the mobile station 4 save the packets n−4 and n−2 in a buffer BF1, and does not save the packets n−5 and n−3.

When a handover occurs in this state, the source base station 1a transfers (forwards) the packets n−5 and n−3, which were not rightly received by the mobile station 4, and the packets n−1 to n, which have not yet been sent to the mobile station 4, to the target base station 1b, and the target base station 1b stores those packets in a buffer BF. Also, after the handover, the host station 2 sends two packets m to m+1 that are intended for the mobile station 4 to the target base station 1b, and the target base station 1b stores those packets in the buffer BF.

After communication with the mobile station 4 becomes possible, the target base station 1b first sends the packets n−5, n−3 and n−1 to n that were forwarded from the source base station 1b to the mobile station 4. Next, the target base station 1b sends the packets m to m+1 that were received from the host station 2. As shown in FIG. 25, the mobile station 4 rearranges the sequence order of the packets n−4 and n−2 that were received before the handover, and the packets n−5, n−3, n−1 and m to M+1 that were received after the handover, and gives those packets in order to an upper layer.

In the explanation above, the case was explained in which all of the packets n−5, n−3 and n−1 to n were transferred (forwarded) to the target base station 1b, however, in some cases, only the packets n−5 and n−3 will be transferred, and transferring of packets n−1 to n will be delayed. FIG. 26 is a drawing explaining packet order arrangement in that case. The target base station 1b stores the transferred packets n−5 and n−3 together with the packets m to m+1 that come from the host station 2 in a buffer BF, however, sends the packets n−5 and n−3 that were forwarded from the source base station 1a to the mobile station 4 first. After that, in the case that packets n−1 and n are forwarded from the source base station 1a later, the target base station 1b monitors whether a set time (waiting time) has elapsed, and when the packets n−1 and n still have not been forwarded from the source base station 1a even after the waiting time has elapsed, the target base station 1b determines that forwarding has been completed and sends the packets m and m+1 that were received from the host station to the mobile station to the mobile station. Even though the packets n−1 and n may be received from the source base station 1a after forwarding has been completed, the target base station 1b discards those packets.

The mobile station 4 executes a process for rearranging the order of the sequence numbers of the received packets (reordering). As shown in FIG. 27, the mobile station 4 rearranges the sequence numbers of the packets n−4 and n−2 that were received before the handover, and the packets n−5, n−3, m and m+1 that were received after the handover, and gives those packets in order to an upper layer.

Protocol Configuration

As described above, in a handover in a LTE communication system, packet transfer (forwarding) and packet reordering are necessary techniques. The relationship between these functions will be explained in more detail here.

FIG. 28 is a drawing explaining the protocol configuration between a mobile station and a base station. Between a mobile station and a base station there is at least a PDCP (Packet Data Convergence Layer) layer, RLC (Radio Link Control) layer and a lower layer (MAC layer/physical layer MAC/PHY). A packet routing function or the like is provided in MME/S-GW.

The main features of each protocol are as described below.

(1) PDCP: In the PDCP layer, the transmitting side compresses the upper protocol header, as well as attaches a sequence number and performs transmission. The receiving side checks the sequence number, and by doing so, performs a discarding process for redundant reception. Retransmission is not performed in the PDCP layer.

(2) RLC: The RLC layer is a layer having a retransmission function, and in the RLC layer, a sequence number is newly attached to the data that is different from the sequence number that is attached to the data from the PDCP layer, and the data is then transmitted. For example, when data having a sequence number n is received from the PDCP layer, that data is divided into a plurality of data, and to each division of data, sequence numbers I(1), I(2), I(3), . . . are attached in the RLC layer, after which the data is transmitted. The receiving side notifies the sending side by using those sequence numbers I(•) to send a transmission confirmation (Ack/Nack signal) indicating whether the data were received rightly or improperly. When an Ack signal is returned, the sending side deletes the data that is saved, however, when a Nack signal is returned, the sending side retransmits the saved data.

(3) Lower Layer

MAC: The MAC layer is a layer that multiplexes/demultiplexes the data of the RLC layer. In other words, the sending side multiplexes the data of the RLC layer and transmits the data, and the receiving side demultiplexes the received data of the MAC layer to RLC layer data.

PHY: The PHY layer is a layer for transmitting and receiving data by radio signals between the user terminal 4 and base station 1, and converts MAC layer data to radio data, or converts radio data to MAC layer data.

Data destined for a mobile station first flows from the upper layer (for example IP layer) to the PDCP layer to become a PDCP SDU (Service Data Unit), then header information (PDCP layer sequence number, etc.) is attached to become a PDCP PDU (Protocol Data Unit).

The PDCP PDU is sent to the RLC to become a RLC SDU, where header information (RLC layer sequence number, etc.) is further attached to become a RLC PDU. The RLC PDU passes through the lower layer processing after which it arrives at the RLC layer of the mobile station. In this RLC layer, the header is deleted and the RLC SDU is reassembled, then in the PDCP layer, the PDCP PDU header is deleted to become a PDCP SDU, then the data is sent to the upper layer.

In this kind of protocol configuration, in a LTE communication system, the forwarding of packets is performed in PDCP SDU units, and reordering is performed in PDCP PDU units. When forwarding is performed in PDCP SDU units, header information such as a sequence number is not attached to the PDCP SDU unit packet, so that sequence number is not forwarded.

Therefore, in a case where the forwarding is performed in PDCP SDU units, it is necessary to forward PDCP SDU data and harder information including the sequence number separately.

The RLC SDU data and PDCP PDU data are essentially the same data, so in the specification for the present invention, unless specifically specified, these will simply be called packets, and when a packet number is provided, that number is the sequence number of the PDCP PDU data.

Operation of the Source Base Station

FIG. 29 is a flowchart of the operation of a source base station during a handover.

When the source base station 1a receives the reception field strength from the user terminal 4 by way of a Measurement Report (step 101), the source base station 1a determines whether or not a handover HO is necessary (step 102), and when a handover is not necessary, returns to the beginning.

However, when it is determined that a handover is necessary, the source base station 1a decides a target base station 1b according to the contents of the Measurement Report, and sends a handover request to that target base station 1b (step 103).

After that, the source base station 1a receives a handover response that is sent from the target base station 1b (step 104), and forwards the remaining packets to a target base station (step 107).

After receiving a resource release message that is sent from the target base station 1b (step 108), the source base station 1a executes the resource release (step 109).

Operation of the Target Base Station

FIG. 30 is a flowchart of the operation of a target base station during a handover.

After receiving a HO request from the source base station 1a (including the mobile station ID, QoS information, etc.) (step 121), the target base station 1b performs call receiving control based on that information, and determines whether to allow the acceptance of the mobile station (step 122), and when the mobile station is not allowed, performs post processing (step 130) and ends handover control.

On the other hand, when acceptance of the mobile station is allowed, the target base station 1b returns a HO response to the source base station 1a (step 123). The target base station 1b then stores the packets that are forwarded from the source base station 1a in a buffer (step 124), and receives a HO complete report from the mobile station 4 (step 125). After receiving the HO complete report, the target base station 1b sends a HO complete report to the host station 2 (step 126). The host station 2 receives the handover complete report, then changes the packet transmission path from the source base station 1a to the target base station 1b, and returns a HO complete response to the target base station 1b. After receiving the HO complete response from the host station 2 (step 127), the target base station 1b starts sending the packets that were forwarded from the source base station 1a to the mobile station preferentially, and after those packets have been sent, sends the packets that were received from the host station 2 to the mobile station (scheduling: step 128). In addition, at the same time as step 128, the target base station 1b sends a resource release to the source base station 1a (step 129), then performs post processing (step 130) and ends handover control.

In the scheduling process of step 128, when forwarding of packets from the source base station 1a is delayed, the target base station 1b monitors whether a set time (Waiting Time) has elapsed, and when no packets have been transferred even though the Waiting Time has elapsed, the target base station 1b determines that forwarding has finished and sends all the packets that were received from the host station 2, and even though packets may be received from the source base station 1a after forwarding has finished, the target base station 1b discards those packets.

Operation of a Mobile Station

FIG. 31 is a flowchart of the operation of a mobile station during a handover.

The measurement unit of the mobile station 4 sends a notification of the reception field strength or the like to the source base station by way of a Measurement Report (step 151). After that, the mobile station 4 waits for a HO instruction from the source base station 1a, and after receiving a HO instruction (step 152), obtains synchronization with the target base station 1b using L1/L2 signaling (step 153), and after synchronization has been obtained, sends a handover complete report to the target base station 1b (step 154), then, in the case where packets are received from the target base station 1b, the mobile station 4 executes a reordering process (steps 155 to 160).

In other words, when the control unit of the mobile station receives lower layer packets from the target base station 1b, the control unit creates RLC SDU data and delivers that RLC SDU (PDCP PDU) data to a reordering unit (step 155). The reordering unit checks whether there are any missing sequence numbers (step 156), and when there are no missing sequence numbers and the sequence numbers are continuous, delivers PDCP SDU data obtained by removing a header from the RLC SDU (PDCP PDU) data to the upper layer (step 160). However, when there is a missing sequence number, the control unit instructs the reordering unit to save the RLC SDU (PDCP PDU) data. By doing so, the reordering unit saves the PDCP PDU data (step 157), and checks whether RLC SDU (PDCP PDU) data having a continuous sequence number has been received (step 158). When RLC SDU (PDCP PDU) data having a continuous sequence number has been received, the reordering unit delivers PDCP SDU data obtained by removing a header from the RLC SDU (PDCP PDU) data to the upper layer, a well as delivers PDCP PDU data obtained by removing a header from the saved PDCP PDU data to the upper layer (step 160).

However, in step 158, when RLC SDU (PDCP PDU) data having a continuous sequence number is not received, the reordering unit monitors whether a preset amount of time has elapsed (step 159), and when that set amount of time has not elapsed, repeats the process from step 157; however, when the set time has elapsed, the reordering unit delivers PDCP SDU data obtained by removing a header from the saved PDCP PDU data to the upper layer even though the sequence numbers may not be continuous (step 160).

Problems

In a LTE communication system, the following problems exist when executing packet forwarding during a handover. That is, as was described above, when a handover is executed in a LTE communication system, a process for taking over the packet for the mobile station that remains at the source base station 1a is executed, and packets are forwarded to a target base station during that taking over process. However, in the handover control described above, if the value of the waiting time by the target base station 1b is small, the target base station 1b begins sending the packets received from the host station regardless of whether or not all of the packets have been forwarded, so a problem occurs in that the packets that have not yet been forwarded are discarded. On the other hand, if the value of the waiting time is large, there is a problem in that the target base station 1b cannot send the packets received from the host station until the waiting time has elapsed even though all of the packets may have already been forwarded, so a transmission delay occurs. In other words, in conventional handover control there is an increase in communication delays and throughput is degraded, making it impossible to maintain high-quality communication immediately before and after a handover.

As first related art is a method of notifying the target base station of the last packet to be forwarded from the source base station (refer to Samsung, "Method to Release Resources at Source ENB During Handover," R3-061032, RAN3#53, September 2006). When forwarding is delayed, the target base station that has been notified of the last packet can transmit the packets received from the host station by starting the sequence numbers of those packets from the sequence number of the last packet+1. In addition, by comparing the sequence numbers of the packets that are forwarded with the sequence number of the last packet, it is possible to forcibly end the waiting time and to detect the end of forwarding with optimum timing. However, in the case that the last packet is deleted during forwarding, the target base station will be unable to accurately detect the last packet.

Moreover, as second related art is a mobile communication system for making high-speed packet data transfer possible with no data loss during a handover between base stations during high-speed packet communication (refer to Japanese patent publication No. JP2004-282652A). When a handover occurs in this mobile communication system, the source base station of the handover transfers (forwards) packet data to the target base station of the handover. However, there is an increase in communication delay due to reordering by the mobile station, and there is no improvement in the degraded throughput.

Furthermore, as third related art is a method in which the target base station jumps the packets sent from the host station without waiting for forwarded packets to arrive (refer to Japanese patent application No. 2006-086537A). In this method, by distinguishing the packets that are received from the source base station from the packets that are received from the host station, transmission is possible in which the packets jump. However, it is necessary for the mobile station to have two order control functions, and the control thereof becomes complicated.

SUMMARY OF THE INVENTION

Taking into consideration the aforementioned problems, it is the object of the present invention to quickly transmit packets that are sent from a host station (for example, a device that is different from a source base station, and that sends data (packets) to a target base station) to a target base station to a mobile station.

Another object of the present invention is to properly reorder forwarded packets even when there is only one order-control function and even when packets that are forwarded from a source base station are mixed with packets that are sent from the host station by excluding the packets that are sent from the host station as the object of order control.

Providing items that are described in the embodiments that are not described in the related art can also be considered as another object of the present invention. Preferably, such items are necessary for obtaining advantages that cannot be obtained with the related art.

Reordering Method

The reordering method of the present invention is a reordering method of sending data (for example, packets), to which information (for example, numbers) that indicates the order of the packets is added, from a target base station to a mobile station, and rearranging the data (packets) at the mobile station according to this order information.

In the reordering method of the present invention, the target base station correlates discriminating information which makes it possible to discriminate data that is forwarded from a source base station from data that is not obtained via the source base station, with data that is sent to the mobile station, and transmits the discrimination information with the data from the target base station to the mobile station. Preferably, in performing the reordering process, the mobile station discriminates the data forwarded from the base station from the data that is not obtained via the source base station based on the discrimination information. Moreover, preferably, the data that is not obtained via the source base station is data that is received from a gateway device. Furthermore, preferably, the data that is sent to the mobile station is in the form of packets.

The reordering method of the present invention, comprises: a step of forwarding packets, which has not yet been sent to the mobile station, or data, for which a confirmation response of right reception has not been received from the mobile station, to a target base station from a source base station; sending that data to the mobile station from the target base station, as well as sending data that is received from a host station to the mobile station; a step of, in the case of sending data received from the host station with the order jumped, giving the data information indicating that the data is jump data, then sending the data from the target base station to the mobile station; and a step of deciding the jump data is not the object of reordering and performing the reordering process on data that is the object of reordering.

Another reordering method of the present invention comprises: a step of forwarding data that has not yet been sent to the mobile station or data for which a confirmation response of proper reception has not been received from the mobile station to a target base station from a source base station; a step of sending data that is forwarded from the source base station before a first set period of time ends and data received from a host station from the target base station to the mobile station; a step of discarding data that is forwarded from the source base station after the first time period has ended; a step of adding information to data to specify the data is the last data that is object of reordering from among data that was received before the first time period ends or adding the information to other data that is sent immediately after that data and sending the data from the target base station to the mobile station and a step of performing reordering process until a second time period ends, and when the data that contains the aforementioned information is received, ending the reordering process even though the second time period has not yet ended.

The reordering method described above, also preferably comprises: a step of giving packets information indicating that the packets are jump packets when sending packets to the mobile station that were received from a gateway with the order jumped and sending the packets to the mobile station from the target base station; and a step of deciding those jump packets are not objects of reordering, and performing the reordering process on packets that are the objects of reordering at the mobile station.

Communication System

The present invention is a communication system in which data (for example, packets), to which information that indicates the order of the data is added, is sent from a target base station to a mobile station, and the data is rearranged in number order at the mobile station.

The communication system of the present invention comprises a mobile station, a source base station that communicates with the mobile station before a handover, and a target base station that communicates with the mobile station after a handover; where (1) the source base station comprises: a buffer that saves data that was received from a host station; a data transmission unit that transmits the data that is saved in the buffer to the mobile station; and a control unit that forwards data that was not sent to the mobile station before execution of a handover sequence, or data for which a confirmation response of right reception has not been received from the mobile station to the target base station; (2) the target base station comprises: a buffer that saves data that is received from the source base station during execution of a handover sequence and data that is received from the host station; a control unit that performs control so that data that is received from the source base station is sent preferentially to the mobile station, and when sending data to the mobile station that is received from the host station with the order jumped, adds information to the data to indicate that the data is jump data; and a transmission unit that transmits data to the mobile station; and (3) the mobile station comprises: a buffer that saves data that is received from a base station; and a reordering control unit that decides the jump data is not an object of reordering, and performs reordering on data that is the object of reordering.

Another communication system of the present invention comprises: a mobile station, a source base station that communicates with the mobile station before a handover, and a target base station that communicates with the mobile station after a handover; where (1) the source base station comprises: a buffer that saves data that is received from a host station; a data transmission unit that transmits the data that is stored in the buffer to the mobile station; and a control unit that forwards data that is not sent to mobile station before execution of a handover sequence, or data for which a confirmation response of right reception has not been received from the mobile station, to the target base station; (2) the target base station comprises: a buffer that saves data that is received from the source base station during execution of a handover sequence and data that is received from the host station; a control unit that performs control to send data that is forwarded from the source base station before a first set period of time ends to the mobile station preferentially as the object of reordering, as well as adds information to data to indicated that the data is last data received as an object of reordering before the first set period of time ends, or adds the information to other data that is transmitted immediately after that data and sends the data from the target base station to the mobile station, and discards data that is forwarded from the source base station after the first set period of time has ended; and a transmission unit that transmits data to the mobile station; and (3) the mobile station comprises: a buffer that saves data that is received from the base station; and a reordering control unit that performs reordering until a second set period of time ends, and when data that contains information identifying that data is the last data that is an object of reordering, is received or when data that contains information indicating that the last data that is an object of reordering has already been received is, is received, ends the reordering process even though the second set period of time has not yet ended.

Base Station/Mobile Station

Another form of the present invention is a base station and a mobile station that form a first or second communication system.

BRIEF DESCRIPTION OF THE DRAWINGS

FIG. 30 is a flowchart of the operation of a target base station during a handover.

FIG. 31 is a flowchart of a mobile station during a handover.

DESCRIPTION OF THE PREFERRED EMBODIMENTS

(A) Theory of the Present Invention

With the present invention, the problems described above are solved by making it possible for a base station and a mobile station to execute the two following procedures.

Procedure 1: When there is a delay in data forwarding from the source base station after a handover, the target base station sends data that has already been received from the host station without waiting to receive the delayed data (jump transmission) and the mobile station is made to be able to recognize that the data. In other words, discrimination information is included in, attached to or correlated with the data in order to recognize that the data is jump data, and transmitted with the data or transmitted using a control channel.

Procedure 2: When it is detected that jump transmission has occurred, the mobile station decides the jump data is not the object of reordering and holds it in a buffer, and the mobile station waits for the data being forwarded from the source base station to arrive. In other words, the mobile station discriminate data that is forwarded from the source station from data that is transmitted without going through the source base station using the discrimination information and performs reordering of the data that is forwarded from the source station.

In the conventional method, when data forwarding from the source base station to the target base station is delayed, the mobile station must wait transmission of the data that is forwarded from the host station to the target base station. Therefore, by waiting until a specified amount of time (Waiting Time) has elapsed for that data from the source base station to arrive, a problem occurs in that delay in communication increases and the throughput is degraded. However, as described above, by performing jump transmission of data, it is possible to quickly send data that was received from the host station to the mobile station even when data transfer (forwarding) from the source base station is delayed, and in doing so, communication delay is reduced. Therefore, when compared with the conventional method, the present invention is able to maintain high-quality communication immediately before and after a handover.

(B) First Embodiment

Figure 1:
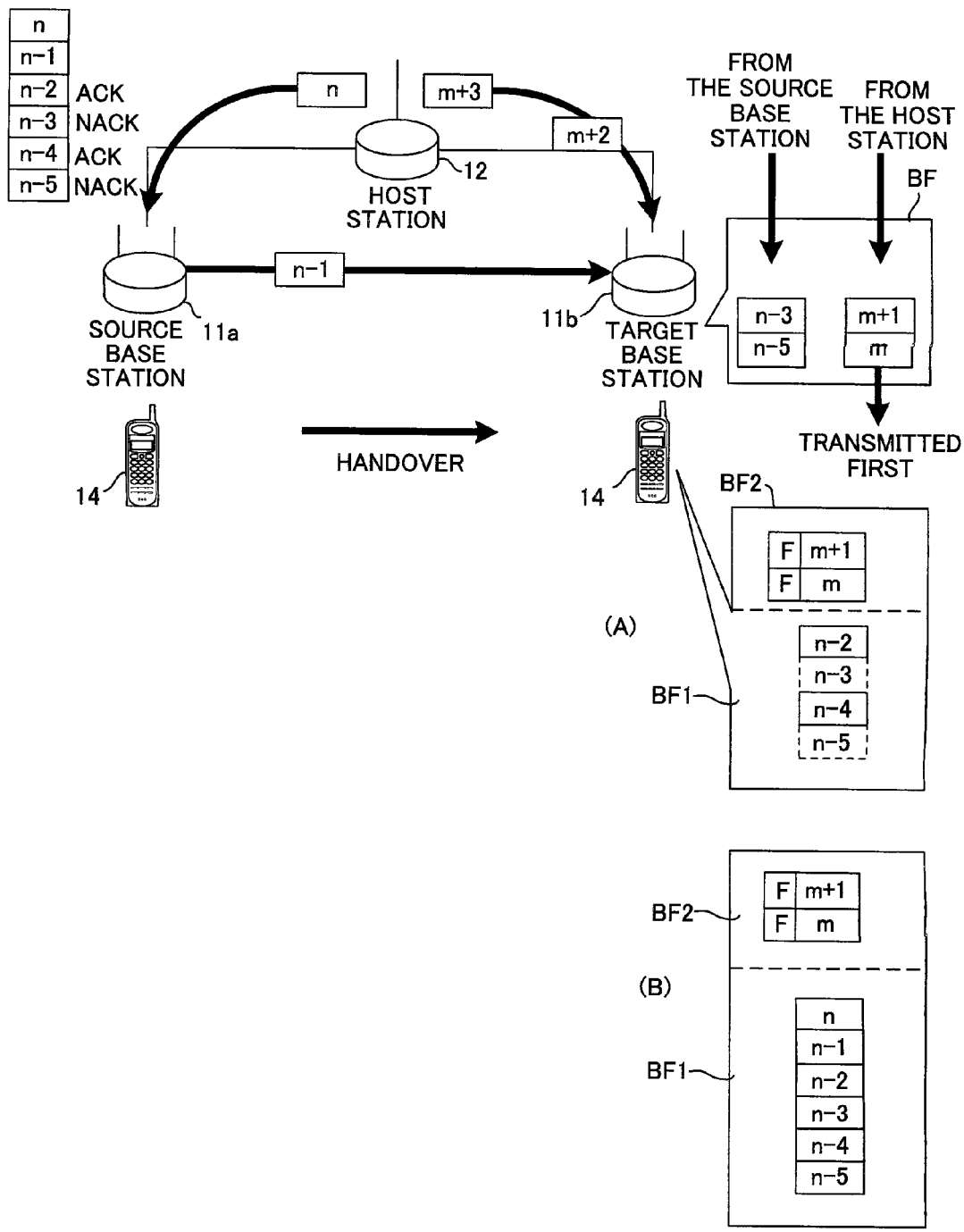
FIG. 1 is a drawing explaining a first embodiment of the invention.

FIG. 1 is a drawing explaining a first embodiment of the invention, and in this embodiment, the case of adding order information to each packet is explained, however, it is also possible to use data having a specified size.

Here it is presumed that before a handover, packets n−5 to n are stored in the source base station 11a, and of these packets, packets n−5 to n−2 are transmitted to the mobile station 14, however, packets n−1 and n are not transmitted to the mobile station 14. For example, the packets n−1 and n arrived at the source base station 11a after the radio communication line between the source base station 11a and mobile station 14 was cut, so these packets n−1 and n could not be transmitted to the mobile station 14. Also, of the packets that were transmitted to the mobile station 14, it is presumed that the mobile station 14 could not rightly receive the packets n−5 and n−3 (NACK), however was able to rightly receive the packets n−4 and n−2 (ACK). Therefore, the mobile station 14 saves packets n−4 and n−2, but does not save packets n−5 and n−3.

When a handover occurs in this state, the source base station 11a transfers (forwards) the packets n−5 and n−3 that could not be rightly received by the mobile station 14 and the unsent packets n−1 and n to the target base station 11b. The forwarding of the packets will be explained below, however, the invention is not limited to this example.

In addition, after the handover, the host station 12 transmits two packets m to m+1 that are destined for the mobile station 14 to the target base station 11b. It is presumed that the transfer (forwarding) of packets n−5 to n is delayed.

When that the target base station 11b receives packets m and m+1 from the host station 12 before packets n−5, n−3, and n−1 to n are forwarded from the source base station 11b, the target base station 11b adds jump ID code F to the packets m and m+1 that are received from the host station 12 and sends those packets to the mobile station 14 first (jump transmission).

The mobile station 14 saves the packets that were received from the base station and to which jump ID code F is added in a buffer BF2, and excludes those packets as objects of the reordering process. In (A) of FIG. 1, the state is shown in which the mobile station 14 saves packets m and m+1 in the buffer BF2, and saves the packets n−4 and n−2 that were received before the handover in buffer BF1.

Next, the target base station 1ib transmits the packets n−5, n−3 and n−1 to n that were forwarded from the source base station 11a to the mobile station 14. The mobile station 14 saves the packets n−5, n−3 and n−1 to n that were received from the target base station 11b in the buffer BF1, then executes the reordering process for these packets that were received after the handover and the packets n−4 and n−2 that were received before the handover (see (B) of FIG. 1), and delivers the packets to the upper layer in the order of continuous sequence numbers.

In a case where the mobile station 14 do not receive packets having continuous sequence number even when a prescribed time has been elapsed, the mobile station ends reordering process, and rearranges the order of the packets that have been already received and delivers them to the upper layer.

The mobile station 14 then delivers the packets to which the jump ID code F has been added in order to the upper layer.

During forwarding, a source base station can transfer an entire packet to a target base station, or can transfer data of just part of the packet (user data portion). Preferably, order information is added to the forwarded data.

In addition, in FIG. 1, sequence numbers (order information) m, m+1 are assigned to the packet for which jump transmission is performed, however, the target base station 11b can assign arbitrary sequence numbers, can add numbers that overlap the sequence numbers that are added to the forwarded packets, or can add numbers that do not overlap.

Jump ID Code

Figure 2:
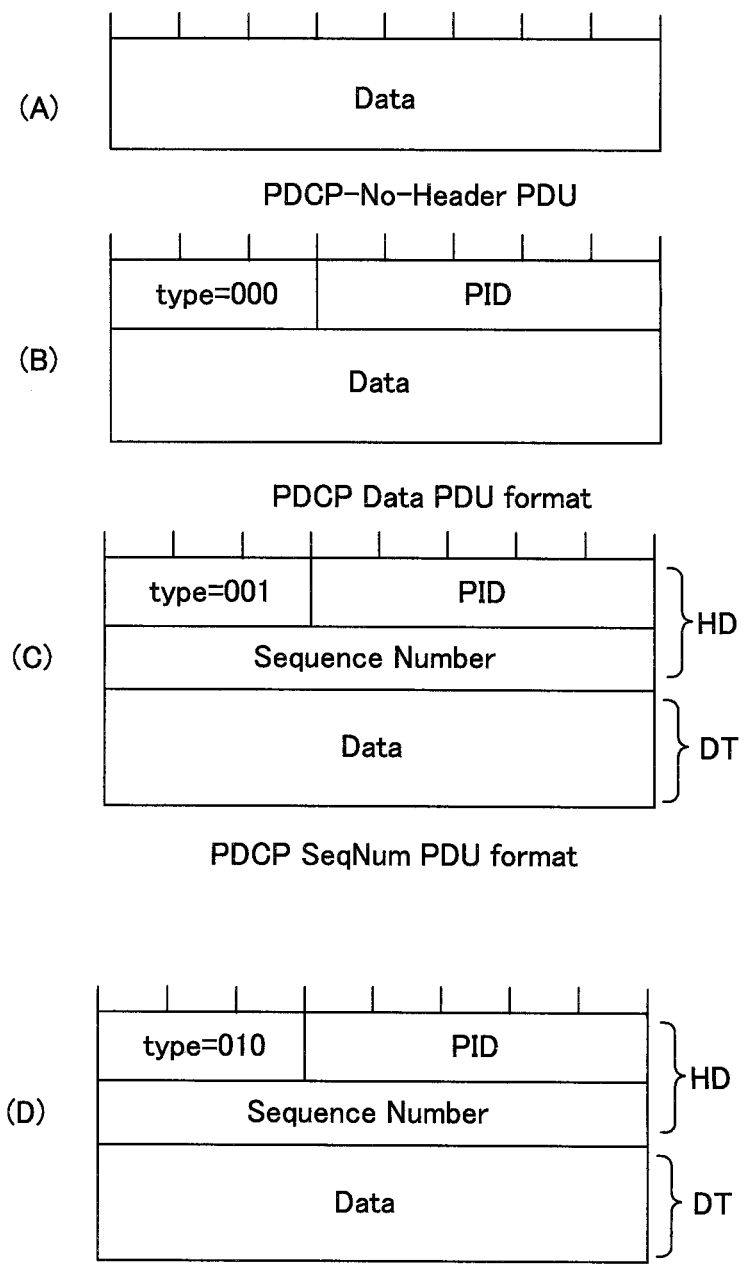
FIG. 2 shows an example of the format of a PDCP PDU packet.

As an example of jump ID code F that is added to packets, a 3-bit 'type' field that is included in the PDCP PDU header is used. In other words, in that type field, a new type number is defined as jump ID code F, and that type number is added to a packet for which jump transmission is performed. FIG. 2 is an example of the PDCP PDU format, where (A) is an example of format when there is no header, (B) is an example of format when the PDCP PDU sequence number is not added, and (C) and (D) are examples of format when the PDCP PDU sequence number is added. In the format of (C) and (D), a type field and PID field are defined in the header HD, where the type field indicates the PDCP PDU type. The PID field is a field that indicates the header compression type that is used for the data included in the data portion. In the type field, 'type=000' and 'type=001' are already regulated, however, the types 'type=010 to 111' are not regulated and are unused. Therefore, 'type=010' is used as the type number (jump ID code) for discriminating the PDCP PDU for which jump transmission is performed.

PDCP Layer and RLC Layer Processing Before and After Handover Control

Figure 3:
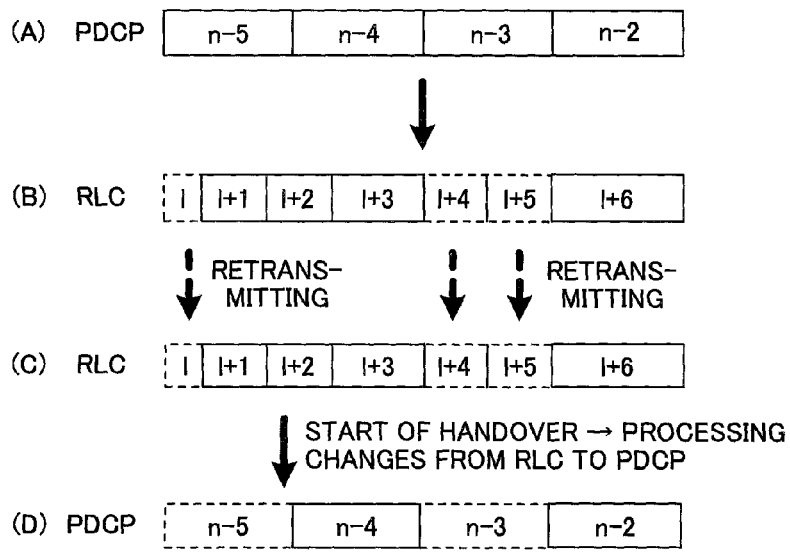
FIG. 3 is a drawing explaining packet processing in the PDCP layer and RLC layer before a handover sequence.

FIG. 3 is a drawing explaining the packet processing of the PDCP layer and RLC layer before a handover. The source base station 11b stores packets n−5 to n−2 of the PDCP layer in a buffer ((A) of FIG. 3), and in the RLC layer the packets are divided into a plurality of data as shown in (B), then RLC layer sequence numbers I, I+1, I+2, . . . , I+6 are added to the divided data, and the data (RLC PDU data) are sent to the mobile station 14. Before a handover, the mobile station performs order control for the PDCP layer using RLC SDU (PDCP PDU) and PLC PDU in the RLC layer. In (C), (D) of FIG. 3, the mobile station 14 did not rightly receive the divided data I, I+4 and I+5, or in other words, packets n−5 and n−3, however, the mobile station 14 did rightly receive packets n−4 and n−2. Before a handover, the mobile station 14 performs order control for the PDCP layer using RLC SDU (PDCP PDU) and PLC PDU in the RLC layer, however, after a handover, the RLC layer is regulated to be initialized. Therefore, processing for order control moves to the PDCP layer, and the mobile station 14 executes the handover sequence in the PDCP layer.

During reordering, the mobile station 14 starts a timer in order to determine when reordering ends.

The arrival of the packets m and m+1 that are received from the host station 2 is early, so jump ID code is attached to those packets m, m+1 and they are sent to the mobile station 14 first (jump transmission). The mobile station 14 saves the packets that are received from the base station and to which jump ID code is attached in a buffer B2(see FIG. 1), and removes them as objects of the reordering process. After that, the mobile station 14 executes the reordering process for the packets n−5, n−3, and n−1 to n that were received from the target base station 11b and the packets n−4 and n−2 that were received before the handover, then delivers the data to the upper layer.

When the specified time TM of the timer has elapsed, the mobile station 14 ends the reordering process and sends the packets that have been received to the upper layer even though there maybe missing packets.

Window Control

Figure 4:
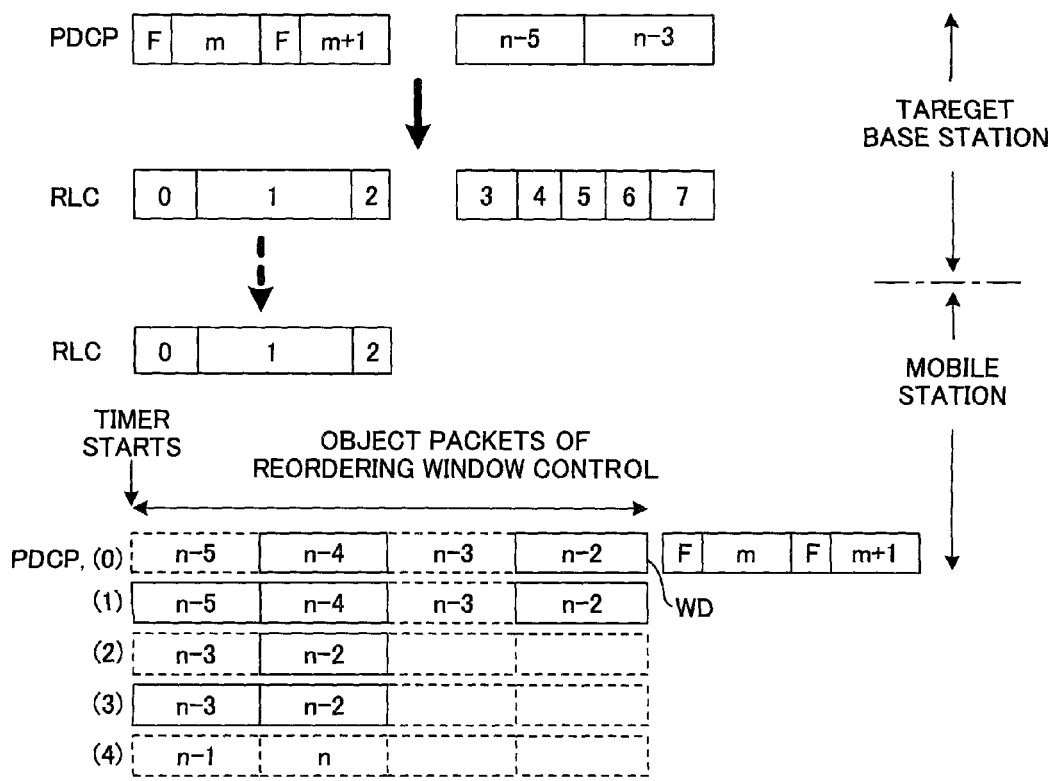
FIG. 4 is a drawing explaining packet processing in the PDCP layer and RLC layer during a handover sequence.

FIG. 4 is a drawing explaining the packet processing of the PDCP layer and RLC layer after a handover, and shows in detail window control.

In consideration of the fact that more than the allowable amount of data arrives, the mobile station 14 internally generates a buffer size window, and during the reordering process, performs the following window control. In the example shown in FIG. 4, the left end of the window WD is initially the number n−5 of the expected data, and the right end of the window is the number decided according to the amount of allowable data (window buffer size), and is taken to be n−2. The mobile station 14 does not apply the window process to the packets to which jump ID code F has been added.

In the initial state (window state (0)), when the mobile station 14 receives the expected packet (n−5) and executes the reordering process, the window state becomes as shown in (1). Therefore, the mobile station 14 delivers the expected packet (n−5) and the packet (n−4) that continues after the packets(n−5) to the upper layer. Thereafter, the window state becomes as shown in (2), and in this state, when the mobile station 14 receives the expected packet (n−3) and performs the reordering process, the window state becomes as shown in (3). Therefore, the mobile station 14 delivers the expected packet (n−3) and the packet (n−2) that continues after the packet(n−3) to the upper layer. The window state then becomes as shown in (4), and in this state, the mobile station 14 waits to receive the packets (n−1) and n, and when the packets are received within the set period of time $T_M$, the mobile station 14 then delivers the packets to the upper layer. However, when the mobile station 14 does not receive the packets (n−1) and n within the set period of time $T_M$, the mobile station 14 delivers the packets starting from packet m that are saved in the buffer BF2 to the upper layer, and moves to normal control as before handover. As was explained above, by removing the jump packets from the reordering process and performing window control as described above, it is possible to execute the reordering processing on just packets n−5 to n.

In this window control, when a packet is received that has a sequence number that is smaller than the sequence number on the left end of the window, the mobile station 14 deletes that packet. Also, when a packet is received that has a sequence number that is larger than the sequence number on the right side of the window, the mobile station 14 takes the sequence number of that packet to be the sequence number on the right side of the window and changes the sequence number on the left side of the window according to the window buffer size, while at the same time, delivers the packets that have moved out of the window range and that have been received to the upper layer.

If this window processing is applied to the jump packets as well, at the instant that packet m is received, the window state will be such that the left side of the window is n−2 and the right side of the window is m. In this case, the mobile station 14 gives up on receiving the packets n−5 and n−3 that have not yet been received, and delivers the already received packets n−4 and n−2 to the upper layer. In addition, the mobile station decides the sequence number of the right side of the window to m, and decides the sequence number of the left side of the window to the number n−1 that is determined according to the window size, then after that waits for packet n−1, packet n, packet n+1, . . . , packet m−1 to arrive. However, since packet n+1 to packet m−1 are packets that do not actually exist, the mobile station uselessly waits to receive those packets, and trouble occurs in packet processing.

Construction of a Base Station

Figure 5:
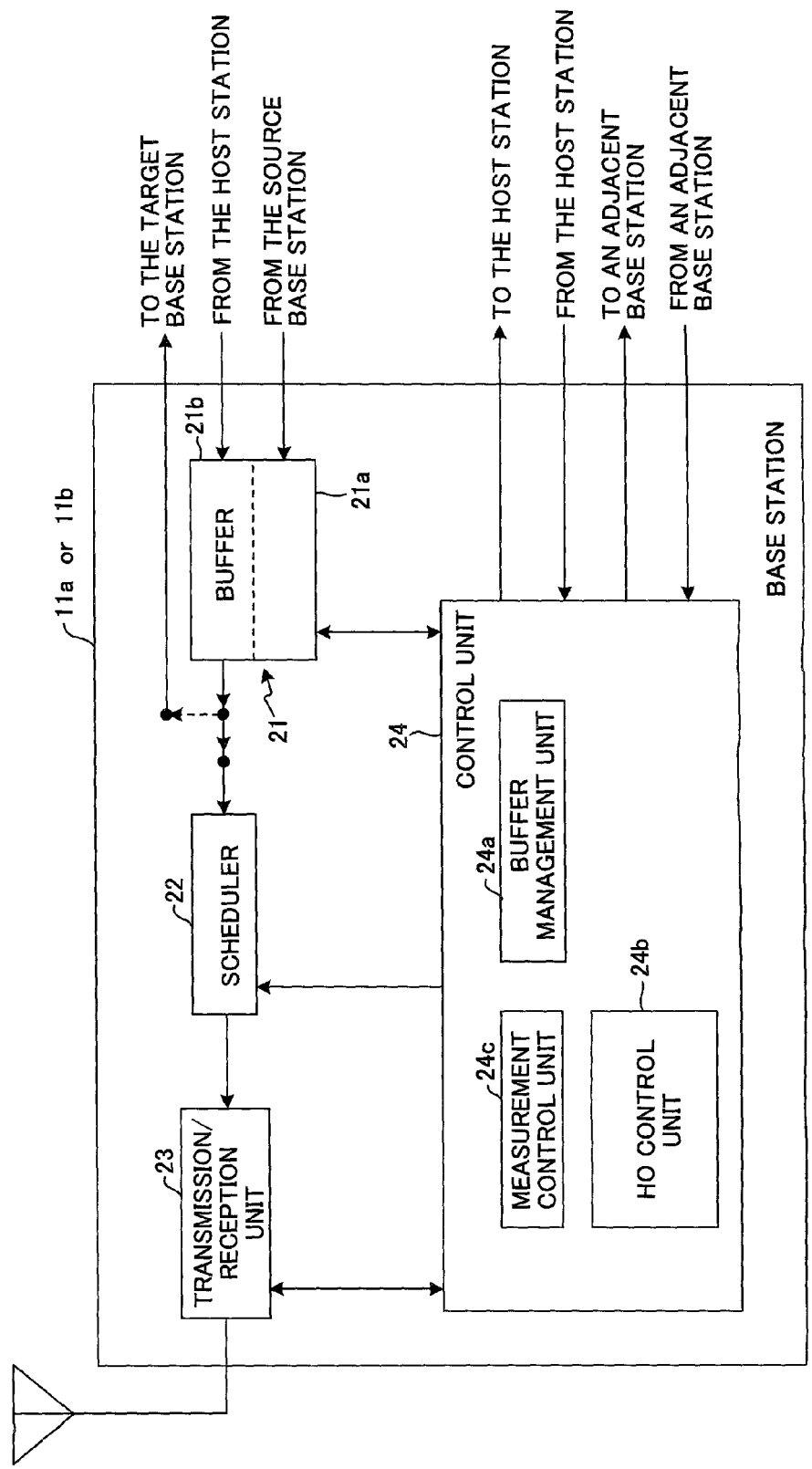
FIG. 5 is a drawing showing the construction of a base station.

FIG. 5 is a drawing that shows the construction of a base station, and shows the buffer unit, scheduler unit, transmission/reception unit and control unit.

The buffer unit 21 is memory for storing packets that come from the host station, and packets that are forwarded from an adjacent base station (source base station). In the FIG. 5, two buffers 21*a*, 21*b* are physically provided, however, construction is also possible in which just one memory is physically provided, and that one memory is used by dividing it using software.

The scheduler unit 22 selects a mobile station from among a plurality of communicating mobile stations with which to perform radio transmission, fetches packets for that mobile station that are stored in the buffer unit and sends them to the transmission/reception unit 23. The transmission/reception unit 23 encodes and modulates the packets that are input from the scheduler unit 22, and transmits the actual data using radio communication. In addition, the transmission/reception unit 23 receives and demodulates control signals and various data that are sent from the mobile station.

The control unit 24 comprises a buffer management unit 24*a*, HO control unit 24*b* and measurement control unit 24*c*. The buffer management unit 24*a* manages the various packets that are stored in the buffer 21. When data is taken over in a handover, the control unit 24 forwards at least the packets that are stored in the buffer unit 21*b* for which a confirmation (ACK) indicating that the packets were rightly received has not been obtained from the mobile station to the target base station 11*b*.

On the other hand, when the arrival of packets that are being forwarded from the source base station 11*a* are delayed due to the take over of data, and jump transmission is performed for the packets that are received from the host station 12, 'type=010' is entered into the type field of the headers of the packets that will jump.

Figure 23:
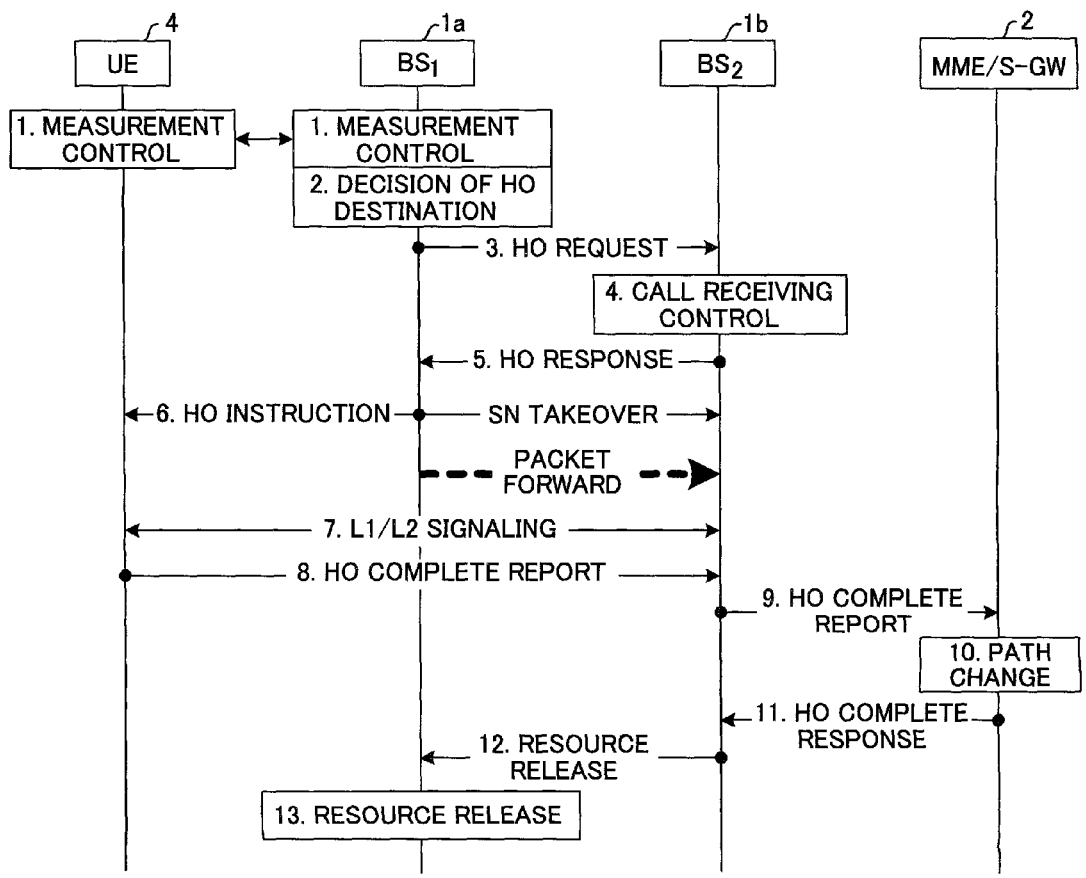
FIG. 23 is a drawing explaining the handover procedure that is currently presumed for a LTE communication system.
Figure 24:
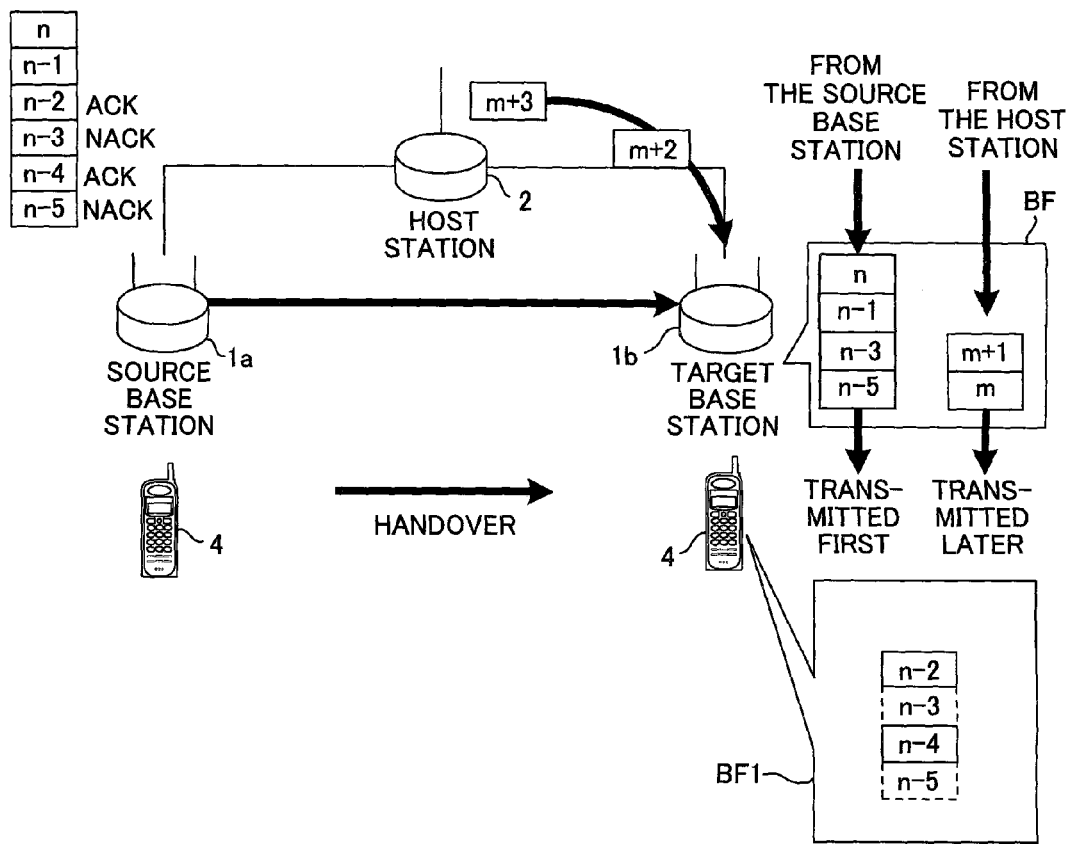
FIG. 24 is a first drawing explaining the reordering process by a mobile station.
Figure 25:
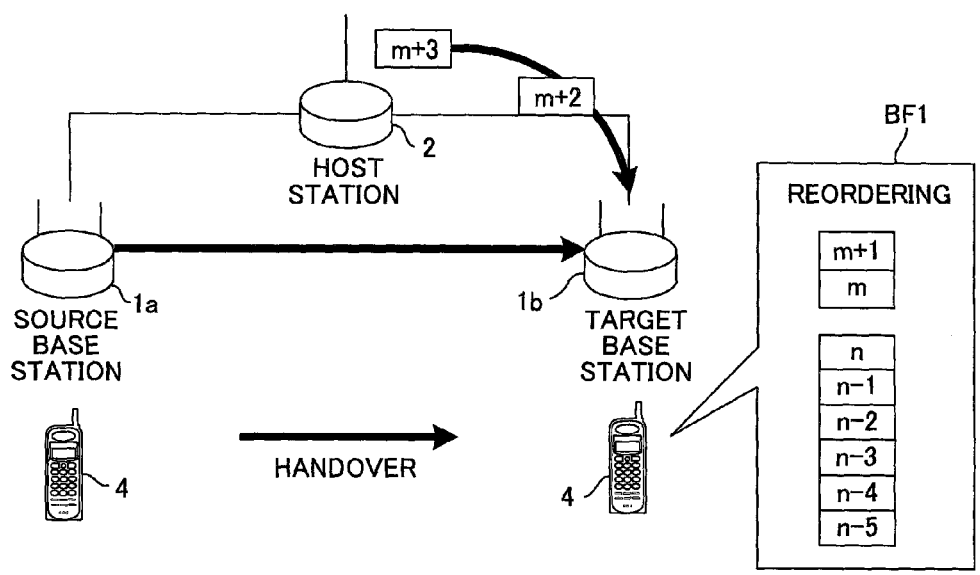
FIG. 25 is a second drawing explaining the reordering process by a mobile station.
Figure 26:
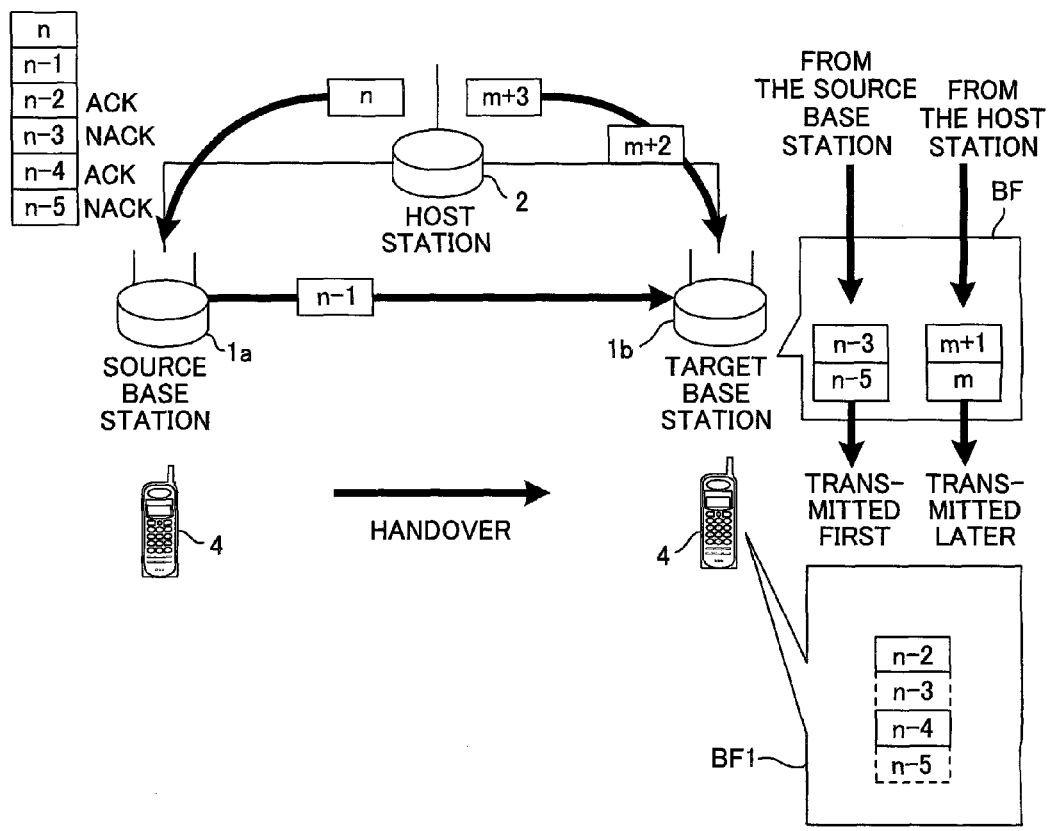
FIG. 26 is a third drawing explaining the reordering process by a mobile station.
Figure 27:
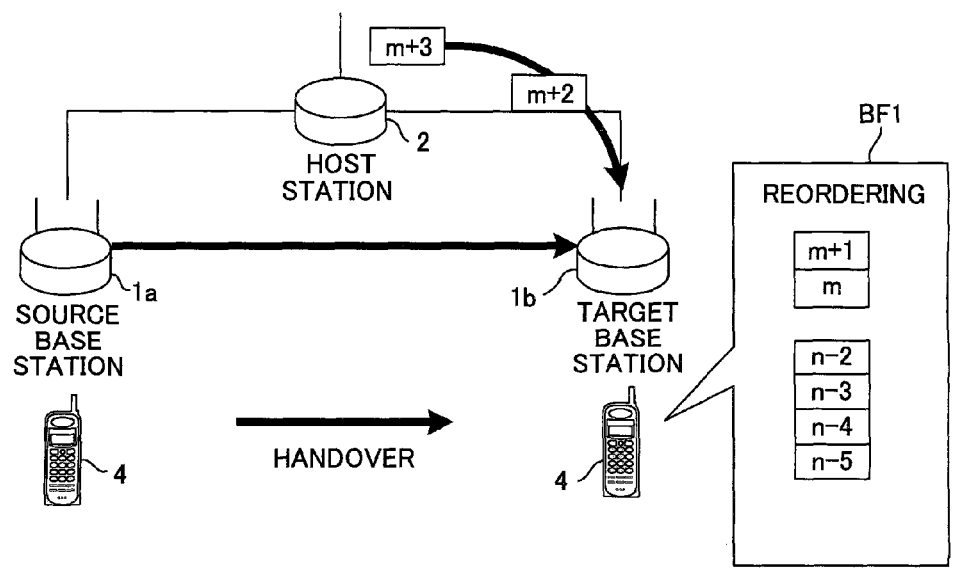
FIG. 27 is a fourth drawing explaining the reordering process by a mobile station.
Figure 28:
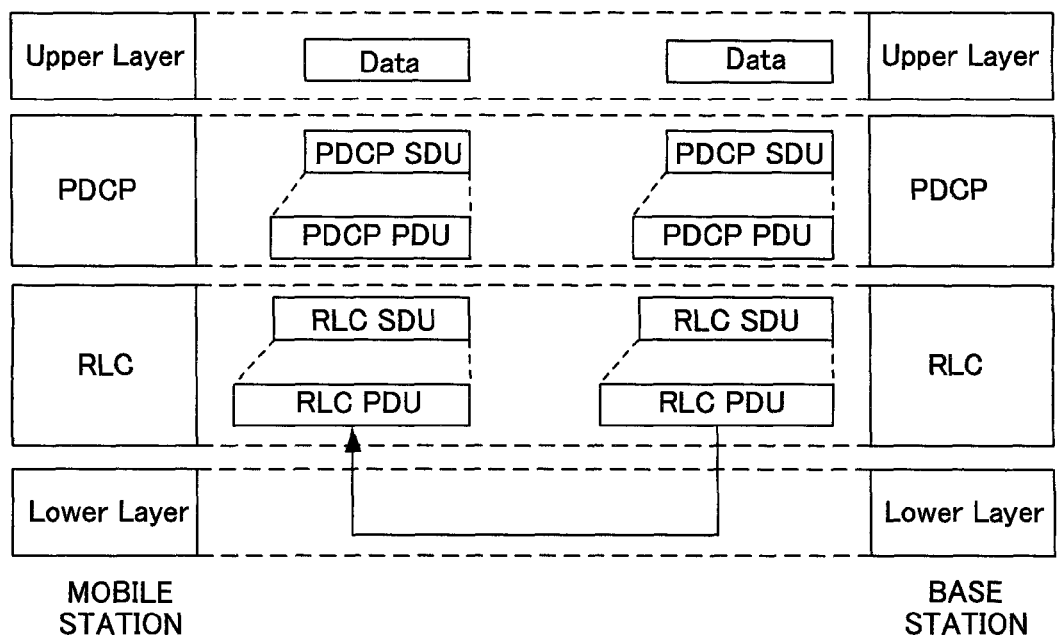
FIG. 28 is a drawing explaining the protocol configuration between a mobile station and a network.
Figure 29:
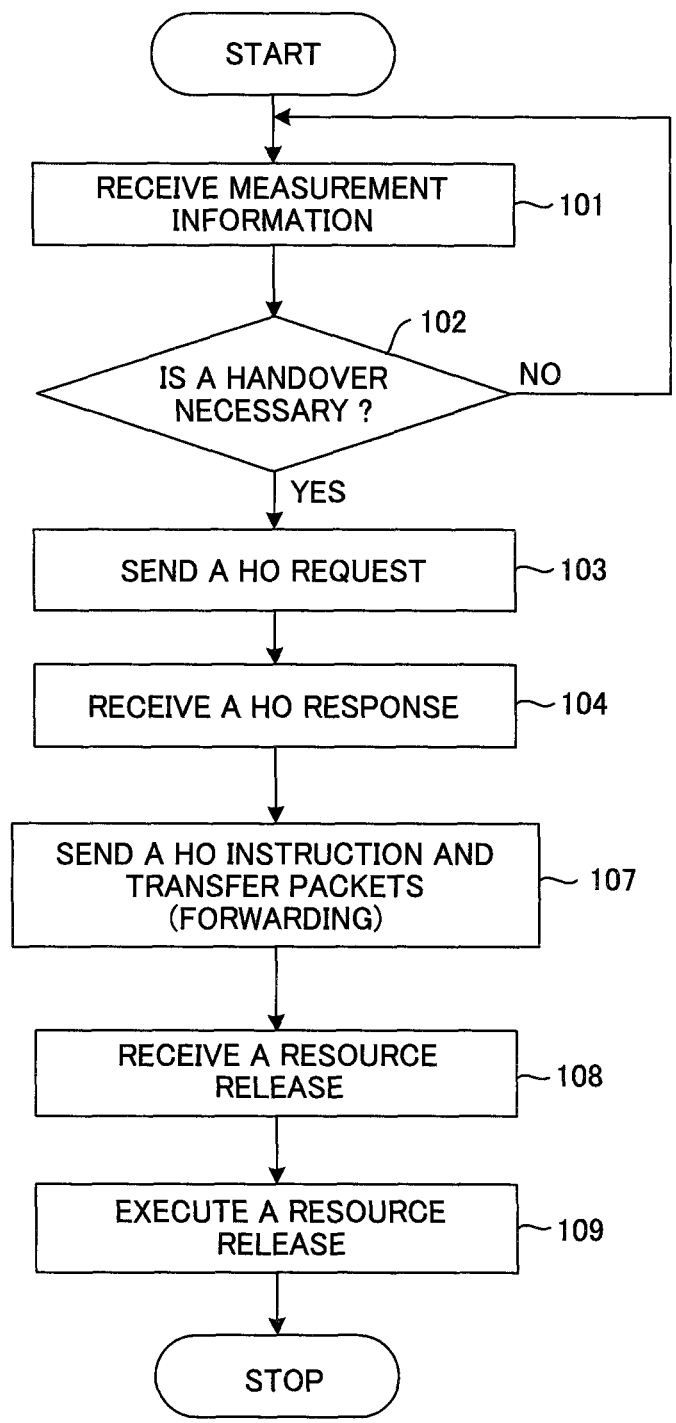
FIG. 29 is a flowchart of the operation of a source base station during a handover.

The HO control unit 24*b* executes handover control as explained in FIG. 23, and the measurement control unit 24*c* gathers various measurement data that is sent from the mobile station, such as the radio communication quality CQI (Channel Quality Information) of the mobile station and the like.

Construction of a Mobile Station

Figure 6:
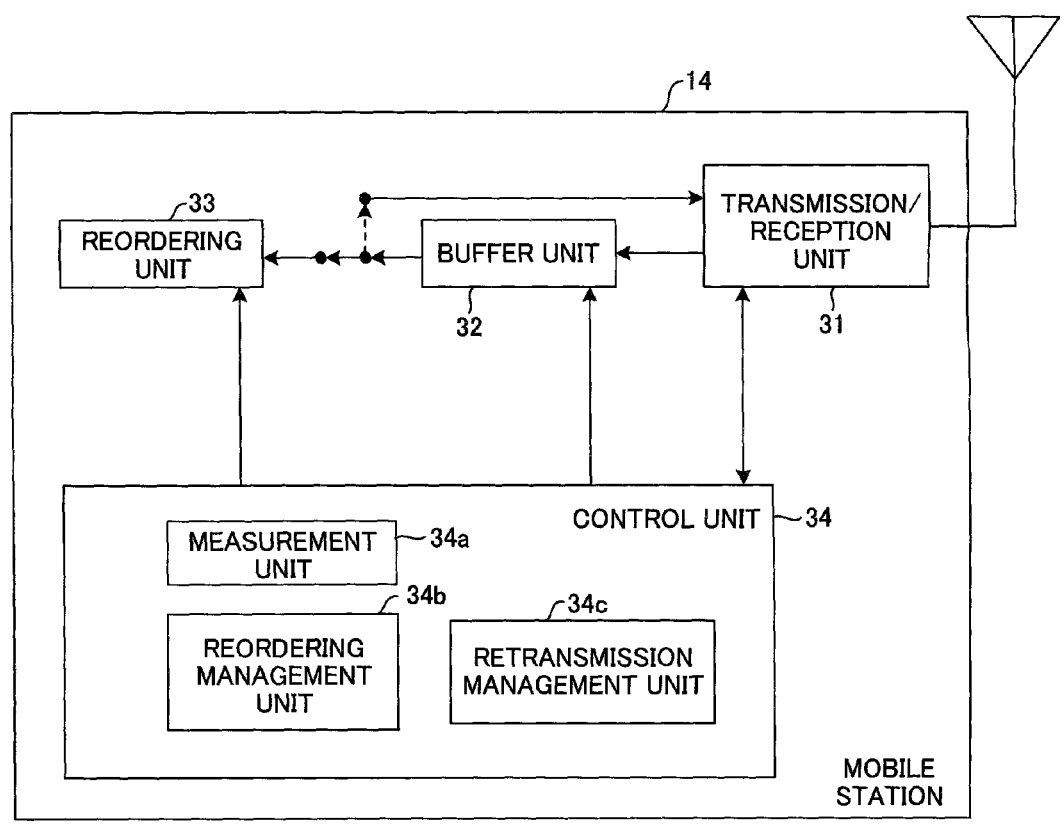
FIG. 6 is a drawing showing the construction of a mobile station.

FIG. 6 is a drawing showing the construction of a mobile station, and shows the transmission/reception unit 31, buffer unit 32, reordering unit 33 and control unit 34. The transmission/reception unit 31 transmits packets and control information to or receives packets and control information from a base station. When RLC PDU data could not be created from a lower-layer packet that was received, the buffer unit 32 holds that lower-layer packet until that RLC PDU data can be created, and after the RLC PDU data is created, the buffer unit 32 removes the header and delivers that data to the reordering unit 33 as RLC SDU (PDCP PDU) data. The reordering unit 33 has a function for rearranging the PDCP PDU data in order of sequence numbers and delivers the data to the upper layer. When a missing PDCP PDU sequence number is detected, the reordering unit 33 saves the PDCP PDU data following that PDCP PDU data in internal memory until the PDCP PDU data with the continuing sequence number is received. However, when that PDC PDU data has still not arrived after a set period of time has elapsed, the reordering unit 33 stops the reordering process and delivers all of the stored PDCP PDU data to the upper layer. Moreover, the reordering unit 33 performs window control so that the amount of data being processed does not exceed the allowable amount.

The control unit 34 comprises a measurement unit 34*a*, reordering management unit 34*b* and retransmission management unit 34*c*. The measurement unit 34*a* measures various kinds of measurement information that are sent to a base station. For example, the measurement unit 34*a* measures the radio communication quality (Channel Quality Information) of the mobile station. The reordering management unit 34*b* controls the reordering unit 33, and when there is a missing sequence number in the PDCP PDU data that is held by the reordering unit 33, the reordering management unit 34*b* instructs the reordering unit 33 to wait for that PDCP PDU data having the continuing sequence number to arrive. Moreover, when a set amount of time for waiting for that packet to arrive has elapsed, the reordering management unit 34*b* instructs the reordering unit 33 to stop the reordering process, as well as instructs the reordering unit 33 to delete the headers of all of the saved PDCP PDU data and to delivers that data to the upper layer as PDCP SDU data, then sets the reordering unit 33 to a state in which it is able to receive new PDCP PDU data. In addition, the reordering management unit 34*b* finds the maximum sequence number from among sequence numbers that have been received up to that time as the sequence number on the right end of the window, and determines and sets the sequence number of the left end of the window by taking into considering the window size. Here, in the case where there is a packet that has already been received that has a sequence number that is smaller than the sequence number on the left end of the window, that packet is immediately delivered to the upper layer. When there is retransmission control, the retransmission management unit 34*c* sends a retransmission request signal to a base station via the transmission/reception unit by a route indicated by the dashed line.

Operation of the Target Base Station

Figure 7:
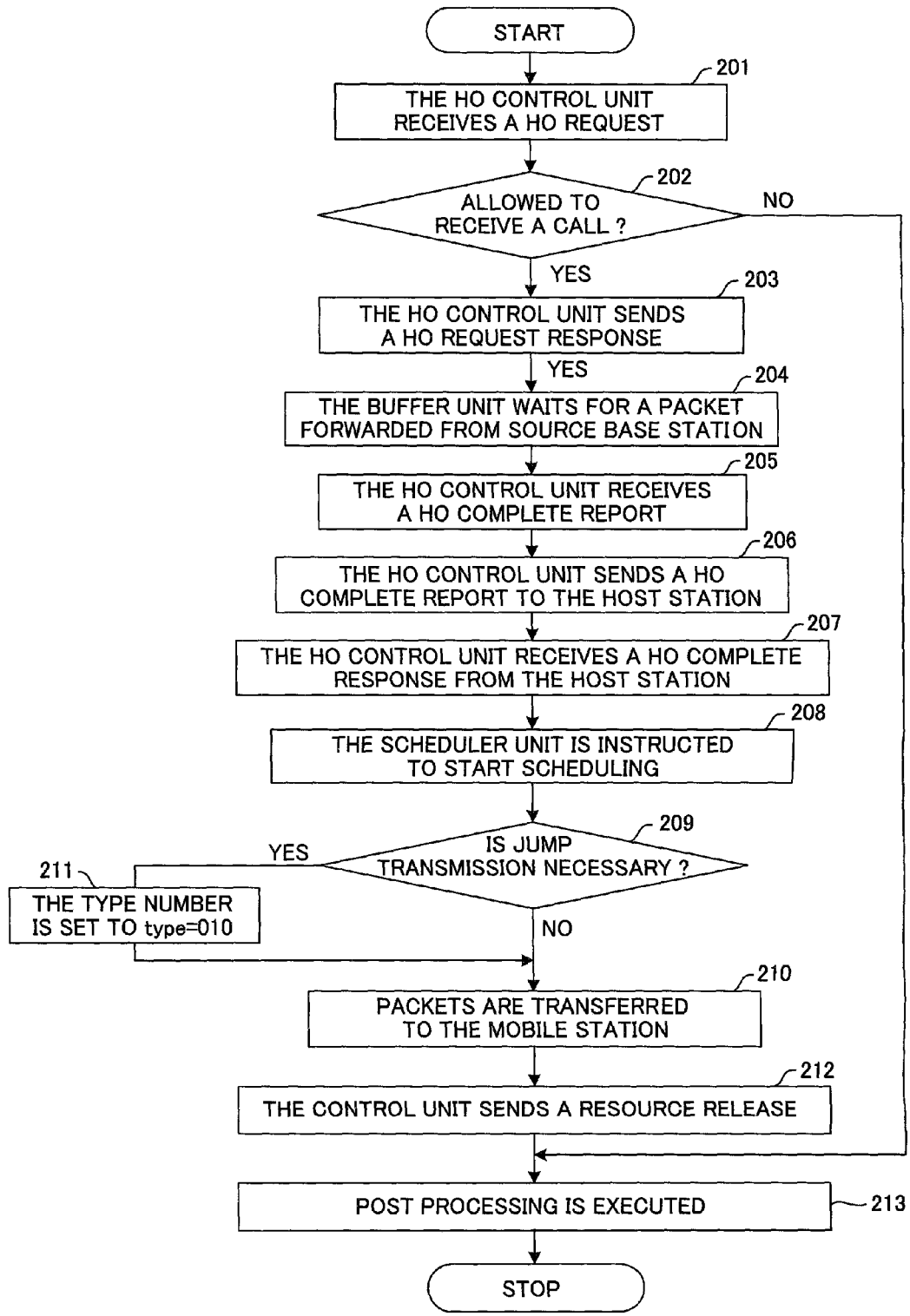
FIG. 7 is a flowchart of the operation of a target base station in a first embodiment of the invention.

FIG. 7 is a flowchart showing the operation of the target base station in a first embodiment of the invention.

When the handover control unit 24*b* of the target base station 11*b* receives a HO request from the source base station 11*a* (including the mobile station ID, QoS information, and the like) (step S201), the handover control unit 24*b* determines whether to allow accepting the mobile station (step 202). When accepting the mobile station is not allowed, the handover control unit 24*b* performs post processing (step 213) and ends handover control.

On the other hand, in a case where the handover control unit 24*b* allows the acceptance of the mobile station, the handover control unit 24*b* return a HO request response message to the source base station 11*a* (step 203). Then the target base station waits the packets that are forwarded from the source base station 11*a*. When the packets arrivers from the source base station, the buffer 21 stores them (step 204).

When the handover control unit 24*b* receives a HO complete report from the mobile station 14 (step 205), the handover control unit 24*b* then sends a HO complete report to the host station 12 (step 206). After receiving the HO complete report, the host station 12 changes the transmission path for packets from the source base station 11*a* to the target base station 11*b*, and returns a HO complete response to the target base station 11*b*. After the handover control unit 24*b* of the target base station 11*b* receives the HO complete response from the host station 12 (step 207), the handover control unit 24*b* sends an instruction to the scheduler unit 22 to start transmitting packets (step 208).

From this, the scheduler unit 22 checks whether jump transmission of packets is necessary (step 209), and when jump transmission is not necessary, the scheduler unit 22 sends the packets that were forwarded from the source base station 11*a* to the mobile station 14 first (step 210). However, when forwarding of packets from the source base station 11*a* is delayed, and it is necessary to perform jump transmission of packets, the scheduler unit 22 executes jump transmission of the packets that were received from the host station 12.

In order to execute jump transmission, the scheduler unit 22 sets the type number in the type fields of the packets for which jump transmission will be performed to 010 (type=010) in order that the mobile station 14 will be able to recognize that the packets are jump packets (step 211), then after that, sends the packets to the mobile station 14 (step 210).

At the same time as this, the handover control unit 24b sends a resource release to the source base station 11a (step 212), then performs post processing (step 213) and ends handover control.

Operation of the Source Base Station

Figure 8:
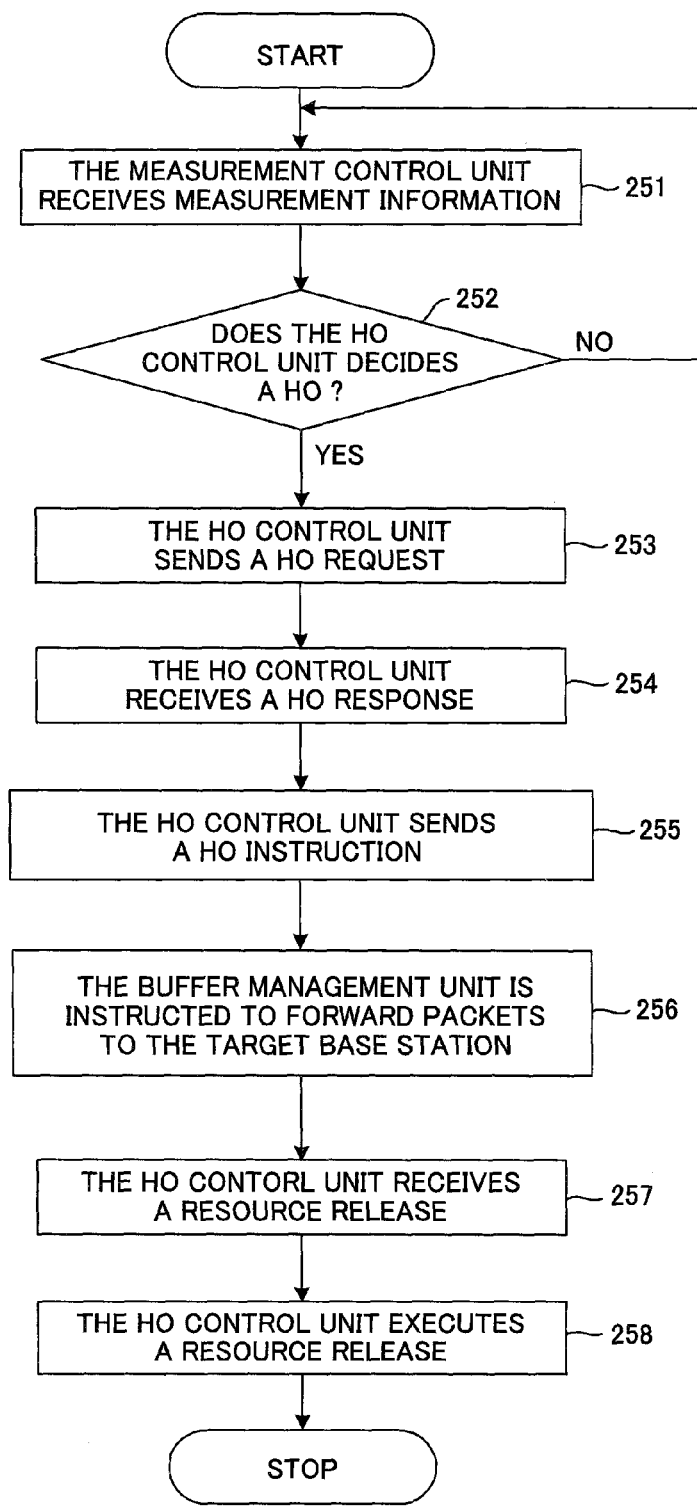
FIG. 8 is a flowchart of the operation of a source base station in a first embodiment of the invention.

FIG. 8 is a flowchart showing the operation of a source base station in a first embodiment of the invention.

In FIG. 8, when the measurement control unit 24c of the source base station 11a receives a Measurement Report which indicates reception state information from the mobile station 14 (step 251), the handover control unit 24a determines whether or not a handover (HO) is necessary based on that reception state information (step 252), and when a handover is not necessary, returns to the start.

However, when the handover control unit 24b determines that a handover HO is necessary, the handover control unit 24b decides a target base station 11b according to the contents of the Measurement Report and sends a handover request to that target base station 11b (step 253).

After that, when a HO response message that is sent from the target base station 11b is received (step 254), the HO control unit 24b sends a HO instruction message to the mobile station 14 (step 255), and instructs the buffer management unit 24a to forward packets that are saved in the buffer 21b to the target base station 11b. Thereby, using the route indicated by the dotted line, the buffer management unit 24a forwards packets that are saved in the buffer 21b and that were not sent to the mobile station 14, or packets that were not received rightly (NACK packets) by the mobile station, to the target base station 11b (step 256). After that, when a resource release message is received from the target base station 11b (step 257), the HO control unit 24a performs a resource release (step 258).

Operation of the Mobile Station

Figure 9:
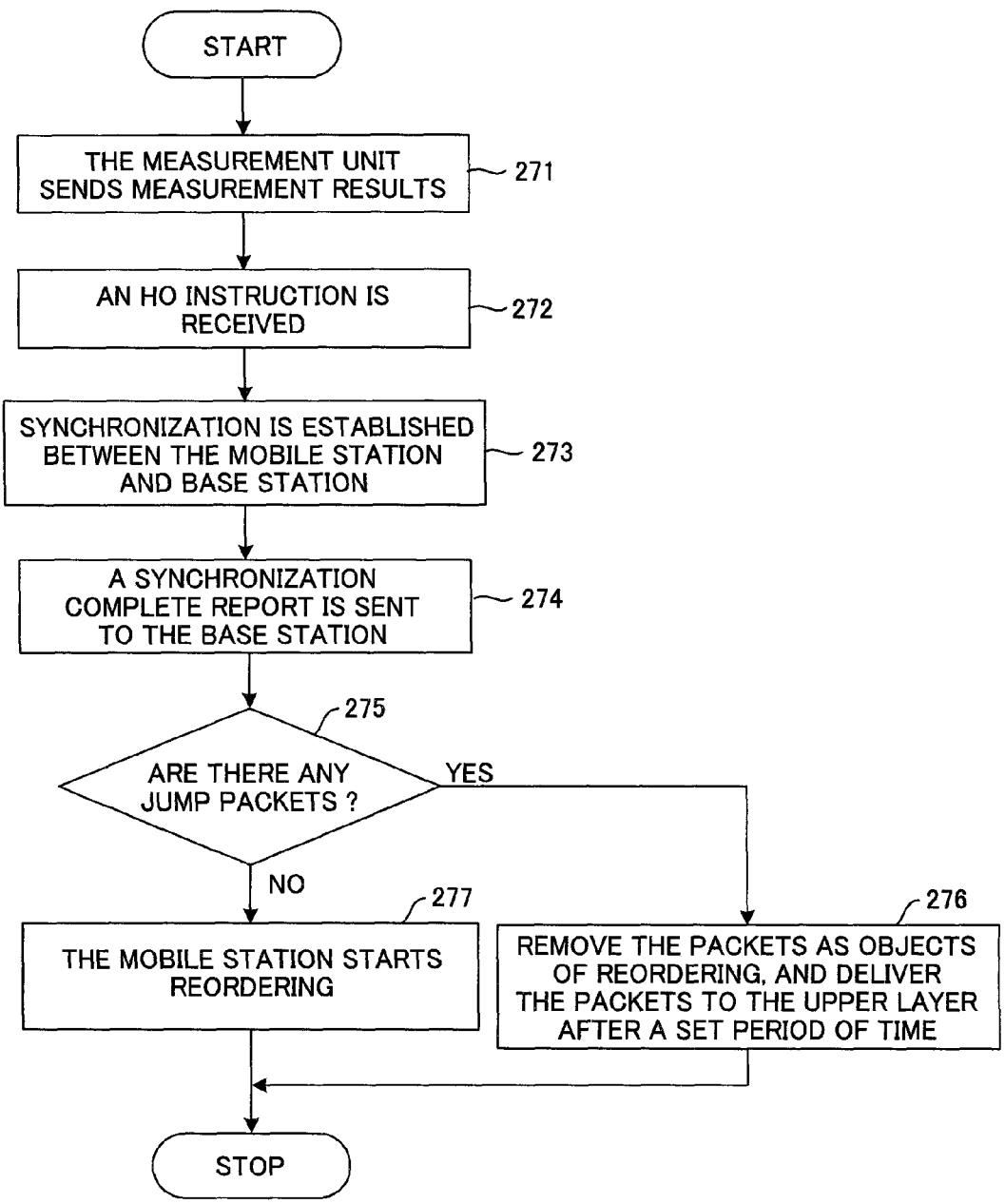
FIG. 9 is a flowchart of the operation of a mobile station in a first embodiment of the invention.

FIG. 9 is a flowchart showing the operation of the mobile station.

The measurement unit 34a of the mobile station 14 notifies the source base station 11a of the reception status using a Measurement Report (step 271). The control unit 34 then waits for a HO instruction message to be sent from the source base station 11a, and when a HO instruction message is received (step 272), the control unit 24 establishes synchronization between the mobile station and the target base station 11b using L1/L2 signaling (step 273), and after synchronization is established, sends a handover complete report to the target base station 11b (step 274). After that, the control unit 34 checks whether a received packet is a jump packet, or in other words whether the type number of a packet is type=010 (step 275), and when a packet is a jump packet, the control unit 34 removes that packet as an object of reordering and saves the packet in a buffer 32, then after a set period of time has elapsed, removes the header and delivers the packet to the upper layer as a PDCP SDU packet (step 276). On the other hand, when a packet is not a jump packet, the control unit 24 executes reordering, and rearranges the order according to the sequence number, then removes to header from the reordered packets and delivers them to the upper layer as a PDCP SDU packets (step 277).

Figure 10:
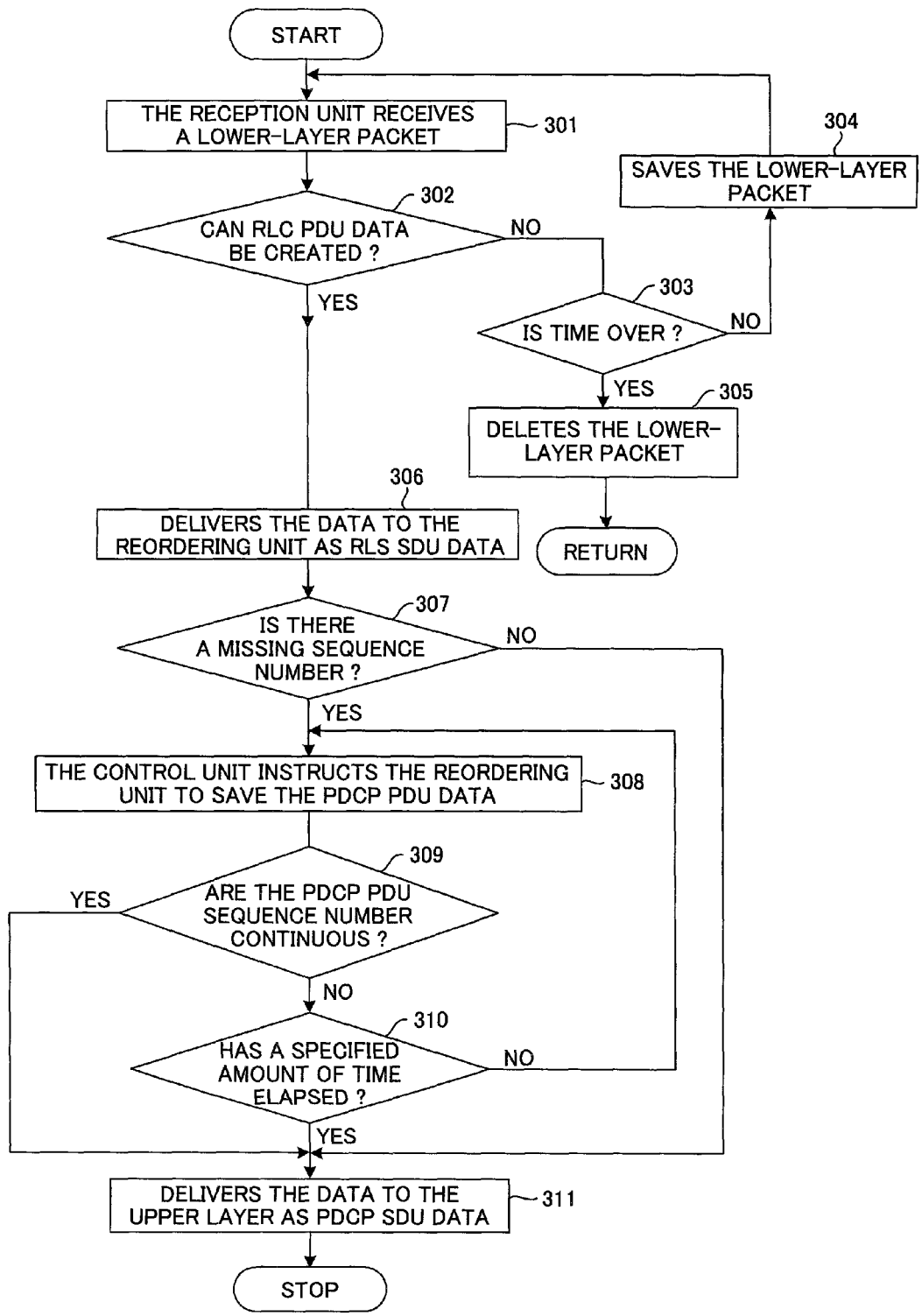
FIG. 10 is a flowchart of the reordering process by a mobile station.

FIG. 10 is a flowchart showing the reordering process by the mobile station.

When the transmission/reception unit 31 of the mobile station 31 receives a lower layer packet from the target base station 11b (step 301), the reordering management unit 34b checks whether it is possible to create RLC PDU data (step 302), and when it is not possible to create RLC PDU data, checks whether a set amount of time has elapsed (step 303), and when the set amount of time has not elapsed, saves the lower layer packet in the buffer 32 (step 304), then performs processing again from step 301. When it is not possible to create RLC PDU data even though a set amount of time has elapsed since the lower layer packet was received, that lower layer packet is deleted from the buffer (step 305).

On the other hand, in step 302, when it is possible to create RLC PDU data using the received lower layer packet, that RLC PDU data is delivered to the reordering unit 33 as RLC SDU (PDCP PDU) data (step 306). After receiving the RLC SDU (PDCP PDU) data, the reordering unit 33 checks whether there is a missing sequence number (step 307), and when there is no missing sequence number and the sequence numbers are continuous, the reordering unit 33 removes the header of that RLC SDU (PDCP PDU) data and delivers it to the upper layer as PDCP SDU data (step 311). However, when there is a missing sequence number, the reordering management unit 34b instructs the reordering unit 33 to save the PDCP PDU data (step 308). Thereby, the reordering unit 33 saves the RLC SDU (PDCP PDU) data, and checks whether RLC SDU (PDCP PDU) data with a continuing sequence number is received (step 309). After receiving RLC SDU (PDCP PDU) data with a continuing sequence number, the reordering unit 33 removes the header of the RLC SDU (PDCP PDU) data and delivers it to the upper layer as PDCP SDU data, and then delivers similarly the saved PDCP PDU as PDCP SDU to the upper layer (step 311).

Moreover, in step 309, when RLC SDU (PDCP PDU) data having a continuing sequence number is not received, the reordering unit 33 monitors a preset period of time $T_M$ (step 310), and when the set period of time has not yet elapsed, repeats processing from step 308, however, when the set period of time $T_M$ has elapsed, the reordering unit 33 removes the header of the saved PDCP PDU data and delivers it to the upper layer even though the sequence numbers are not continuous (step 311).

With the first embodiment of the invention as described above, packets that are transmitted from the host station 12 to the target base station 11b can be transmitted to the mobile station 14 as jump packets without waiting, so it is possible to eliminate delay time of the data, and to improve the throughput of the overall system. Moreover, the mobile station 14 removes jump packets as objects of reordering control (sequence order control), and performs sequence order control on packets other than jump packets and delivers those packets to the upper layer in order of sequence numbers. As a result, the mobile station is able to perform sequence order control of packets even when there is only one order control function.

(C) Second Embodiment

In the first embodiment, the mobile station 14 performed the reordering process during a set period of time TM, and ended the reordering process when that set period of time TM elapsed (see step 310 in FIG. 10). In that case, when the set period of time TM has not yet elapsed even though all of the packets that have been forwarded from the source base station 11a to the target base station 11b are received, the mobile station 14 continues the reordering process. Therefore, in a second embodiment of the invention, in order that the mobile station 14 is able to recognize the last packet that is an object of the reordering process, the target base station 11b adds an identifier to a specified packet (last packet) and transmits that packet to the mobile station 14, and after receiving that last packet, the mobile station 14 immediately ends the reordering process even though the set time TM has not elapsed.

Figure 11:
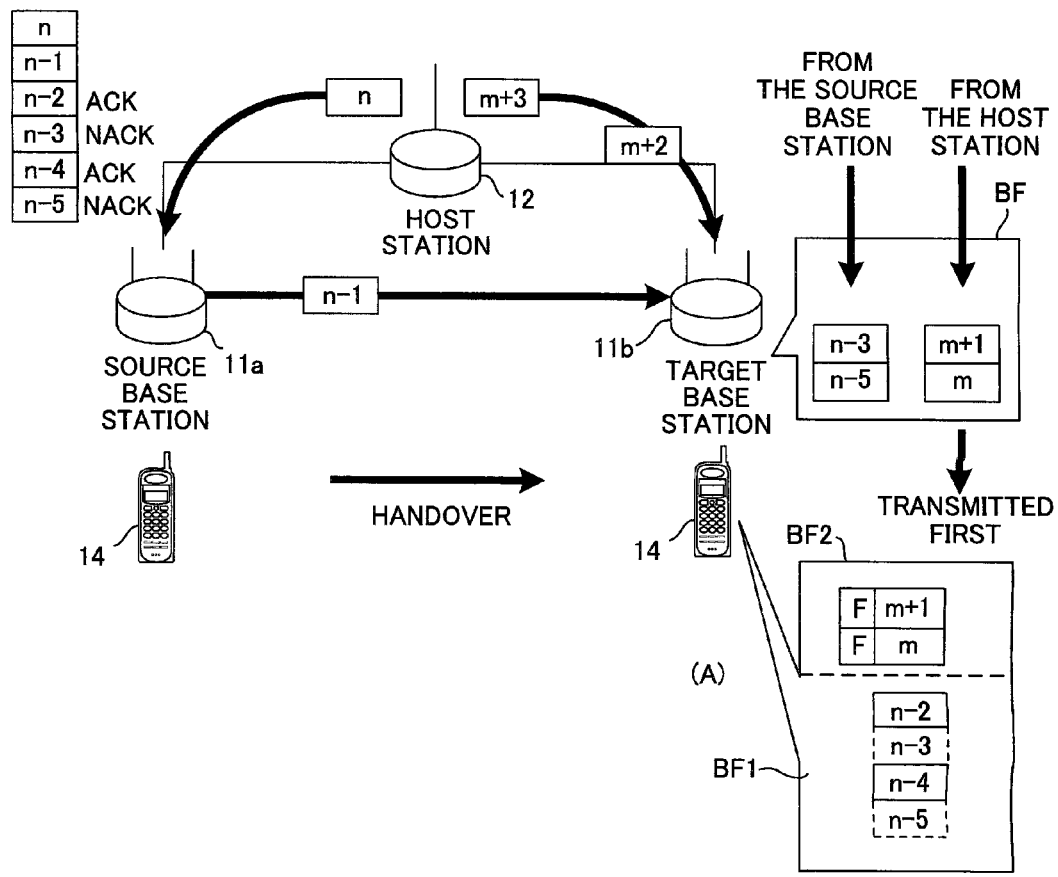
FIG. 11 is a drawing explaining a second embodiment of the invention.

FIG. 11 is a drawing explaining a second embodiment of the invention, where it is presumed that packets n−5 to n are stored at the source base station 11a before a handover, and of these packets, packets n31 5 to n−2 were sent to the mobile station 14, however, packets n−1 and n were not sent to the mobile station 14. For example, packets n−1 and n arrived after the radio communication line between the source base station 11a and the mobile station had been cut, so these packets n−1, n were not sent to the mobile station 14. In addition, it is presumed that of the packets that were sent to the mobile station 14, packets n−5 and n−3 were not received rightly by the mobile station 14 (NACK), and that packets n−4 and n−2 were received rightly (ACK). Therefore, the mobile station 14 saves packets n−4 and n−2, and does not save packets n−5 and n−3.

When a handover occurs in this state, the source base station 11a forwards the packets n−5 and n−3 that were not rightly received by the mobile station 14, and the unsent packets n−1 and n to the target base station 11b. Also, the host station 12 sends two packets m to m+1 to the target base station lib after the handover. It is presumed that the forwarding of the packets n−5, n−3 and n−1 to n is delayed.

When the target base station 11b receives the packets m and m+1 from the host station 12 before the packets n−5, n−3 and n−1 to n are forwarded from the source base station 11a, the target base station 11b adds jump ID code F to the packets m and m+1 that were received from the host station and sends them to the mobile station 14 first (jump transmission). The mobile station 14 saves the packets received from the base station with the jump ID code added in the buffer BF2, and removes them as objects of the reordering process. In (A) of FIG. 11, the state is shown in which the mobile station 14 saves packets m and m+1 in the buffer BF2, and saves the packets n−4 and n−2 that were received before the handover in the buffer BF1.

The target base station 11b sends the packets that are forwarded until a preset time $T_M$ (called the Waiting Time) has elapsed to the mobile station 14, and when the Waiting Time has elapsed the target base station 11b discards any packets that may be forwarded. Therefore, the target base station 11b receives the packets n−5, n−3 and n−1 that were forwarded from the source base station 11a before the Waiting Time elapsed and saves them in the buffer BF, then sends the packets one by one to the mobile station 14. In addition, the target base station 11b receives packet n from the source base station 11a, however, the Waiting Time was complete before the packet n could be sent to the mobile station 14. In this case, the target base station 11b adds an identifier (L) to packet n to indicate that it is the last packet forwarded from the source base station, and sends packet n to the mobile station 14.

The mobile station 14 saves the packets n−5, n−3, n−1 and n that were received from the target base station 11b in the buffer BF1, and as shown in (B) of FIG. 11, executes the reordering process to rearrange these packets and the packets n−4 and n−2 that were received before handover. Moreover, after detecting packet n with the identifier (L) added, the mobile station 14 determines that forwarding has ended, so delivers the packets that have been reordered to the upper layer and ends the reordering process even though the set time period $T_M$ for reordering has not ended.

The case in which the Waiting Time $T_W$ ends before packet n is sent is described above, however, the Waiting Time $T_W$ may end after the packet n has been sent to the mobile station 14. In that case, the target base station 11b adds an identifier (L) to a packet m+2 that will be received from the host station 12 indicating that it is the last packet, and sends the packet m+2 to the mobile station 14. After receiving the last packet to which that identifier (L) has been added, the mobile station 14 determines that forwarding has ended, and immediately ends reordering even though the set period of time $T_M$ for reordering has not ended.

Moreover, packets n−5 and n−3 are received by forwarding, however, the Waiting Time $T_W$ may end in the stage before packets n−1 and n are received. In that case, the target base station lib may add an identifier (L) to packet n−3 indicating that it is the last packet, and sends that packet to the mobile station 14. The mobile station 14 detects the Last packet to which that identifier (L) is added and ends the reordering process.

Last Packet ID Code L

Figure 12:
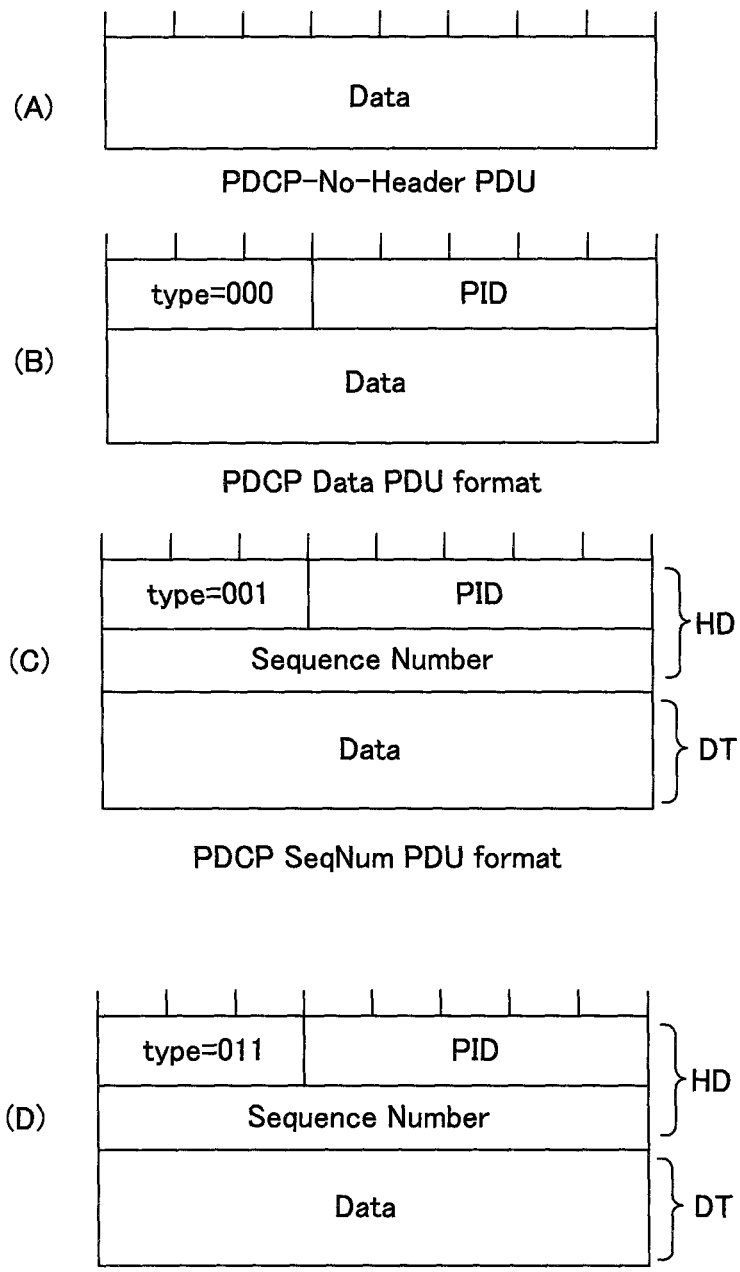
FIG. 12 shows an example of the format of a PDCP PDU packet.

To add an identifier (last packet ID code) L to a packet identifying that the packet is the last packet, a 3-bit 'type' field that is included in the PDCP PDU header is used. In other words, a new type number is defined in that 'type' field as the last packet ID code L, and that type number is assigned to the first packet to be sent after the Waiting Time $T_W$ ends. FIG. 12 shows an example of the PDCP PDU format, where (A) is an example of format without a header, (B) is an example of format in which the PDCP PDU sequence number is not added, and (C) and (D) are examples of format in which the PDCP PDU sequence number is added. In the format shown in (C) and (D), a type field and a PID field are defined in the header HD, where the type field indicates the type of PDCP PDU. For the type field, 'type=000' and 'type=001' are already regulated, however, the type numbers 'type=010 to 111' are not regulated and are unused. Therefore, 'type=011' is used as the type number for recognizing the PDCP PDU packet (last packet) that is to be sent first after the Waiting Time $T_W$ has ended.

PDCP Layer and RLC Layer Processing

Figure 13:
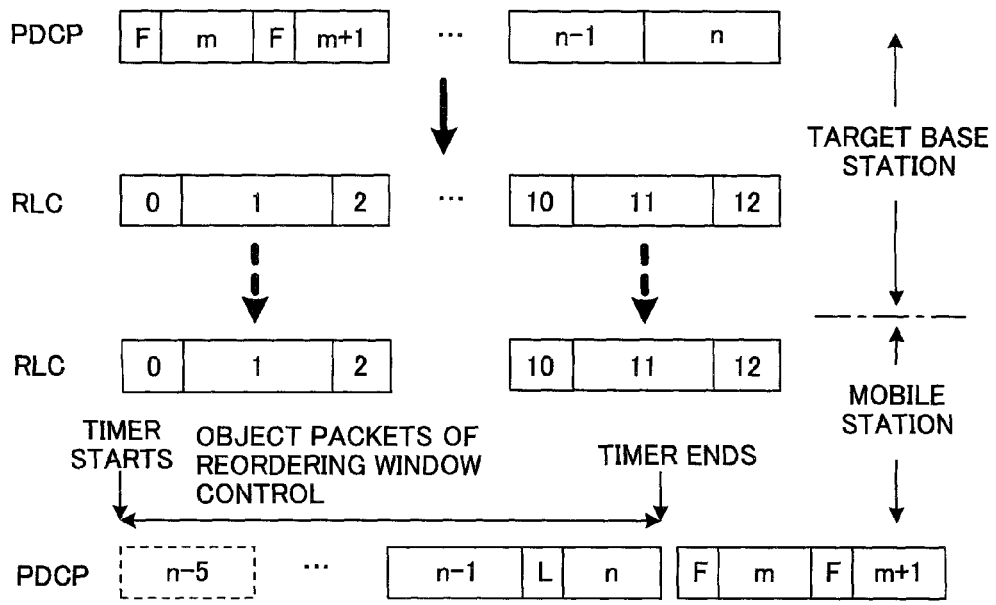
FIG. 13 is a drawing explaining packet processing in the PDCP layer and RLC layer during a handover (1/2).
Figure 14:
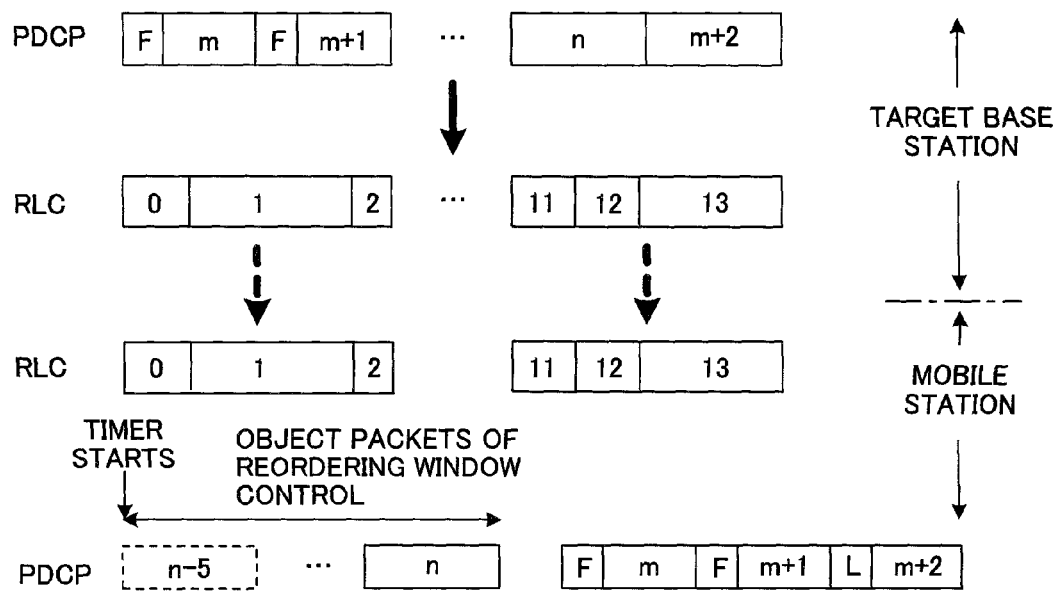
FIG. 14 is a drawing explaining packet processing in the PDCP layer and RLC layer during a handover (2/2).

FIG. 13 and FIG. 14 are drawings explaining packet processing for the PDCP layer and RLC layer after a handover.

FIG. 13 shows the case in which the last packet ID code L is added to the packet n that is sent to the mobile station 14. In the first embodiment, during reordering, the mobile station 14 starts a timer in order to determine the end of reordering. Here, when the set time $T_M$ is set to be a large value, the reordering process continues regardless of whether or not packet n is the last packet forwarded, and the packets cannot be delivered to the upper layer until the set time $T_M$ ends. However, in this second embodiment, after receiving packet n (Last packet) to which the last packet ID code L has been added, the mobile station 14 immediately ends reordering and delivers all of the PDCP PDU packets to the upper layer.

When more than the allowable amount of data arrives at the mobile station 14, the mobile station 14 performs window control during reordering. The left side of the window is n−5, which is the number expected for arrival, and the right side of the window is the value of the upper limit of the allowable amount of data (in the figure, this value is n). However, window processing is not applied to 'type=010' packets (jump packets) as in the first embodiment. By performing processing in this way, it is possible to execute reordering from packet n−5 to packet n.

FIG. 14 shows the case in which last packet ID code L is added to packet m+2. At the instant that packet m+2 (Last packet) is received, the mobile station 14 immediately ends reordering even though the set time $T_M$ may not have ended yet, and delivers all of the received PDCP PDU packets to the upper layer. Also, in the case of window control, the mobile station 14 executes window control in the same way as shown in FIG. 13.

Operation of the Target Base Station

Figure 15:
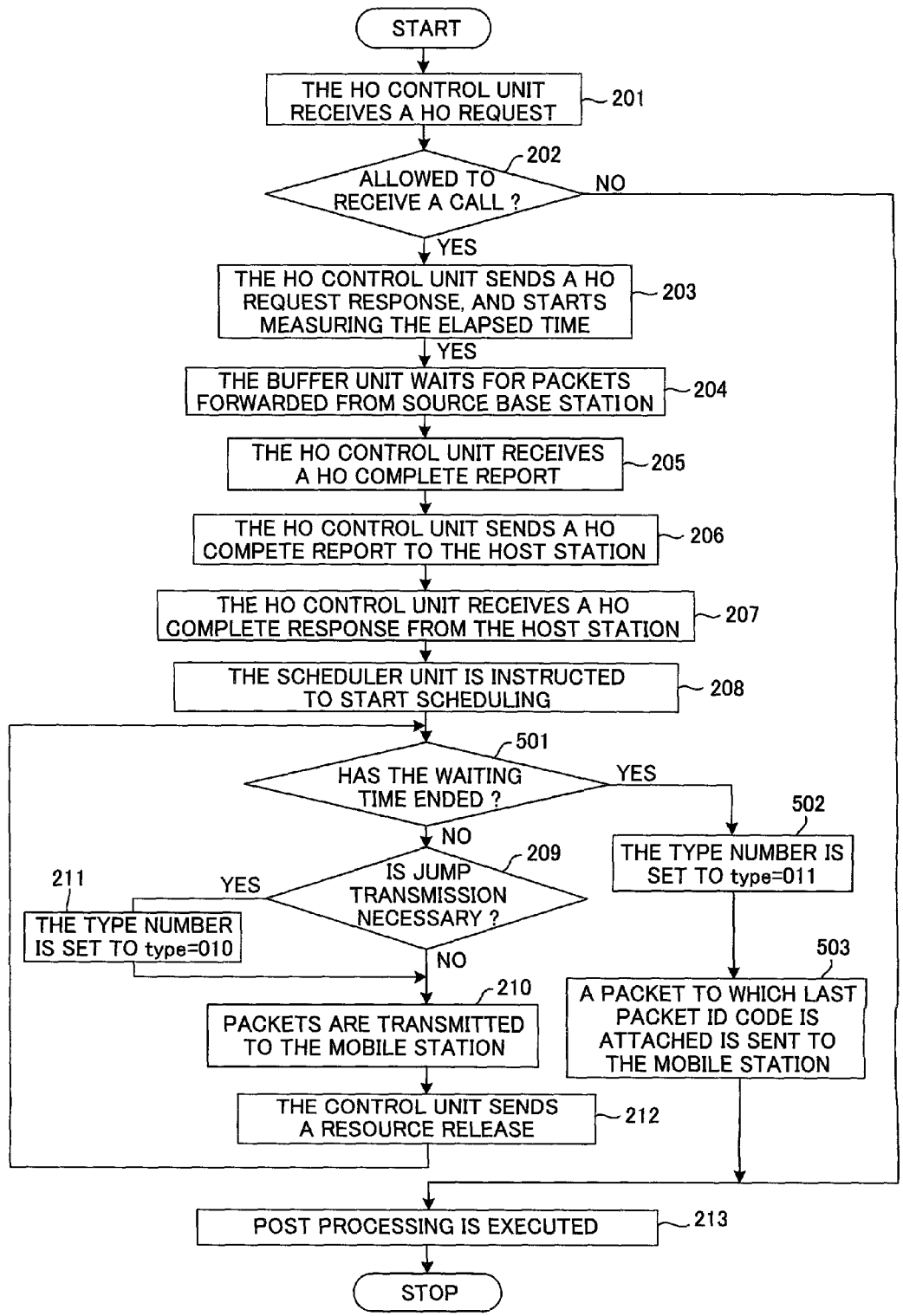
FIG. 15 is a flowchart of the operation of a target base station in a second embodiment of the invention.

FIG. 15 is a flowchart showing the operation of the target base station in the second embodiment of the invention, where the same reference numbers are given to steps that are the same as the steps of the first embodiment shown in FIG. 7. The base stations and mobile station of this second embodiment have the construction shown in FIG. 5 and FIG. 6.

When the handover control unit 24b of the target base station 11b receives a HO request from the source base station 11a (includes the mobile station ID, QoS information, etc.), the handover control unit 24b performs call-receiving control based on that information and determines whether to allow acceptance of the mobile station. When acceptance is not allowed, the handover control unit 24b performs post processing, and ends handover control (steps 201 to 202, and 213).

On the other hand, when the handover control unit 24b allows the acceptance of the mobile station 14, the handover control unit 24b returns a HO request response message to the source base station 11a, and starts measuring the elapsed time. After that, the target base station 11b waits for packets forwarded from the source base station 11a, and stores the packets in the buffer unit 21 (steps 203 and 204).

In this state, after receiving a HO complete report from the mobile station 14, the handover control unit 24b sends a HO complete report to the host station 12 (steps 205 and 206). After the host station 12 receives the handover complete report, the host station 12 then changes the transmission path for the packets from the source base station 11a to the target base station 11b, and returns a HO complete response to the target base station 11b. The handover control unit 24b of the target base station 11b receives the HO complete response from the host station 12, and then instructs the scheduler unit 22 to start transmitting packets to the mobile station(steps 207 and 208).

Next, the scheduler unit 22 monitors whether or not the elapsed time has exceeded a set period of time $T_W$, that is, whether or not the Waiting Time has ended (step 501), and when the Waiting Time has not ended, checks whether it is necessary to perform jump transmission of packets (step 209), and when it is not necessary, starts sending packets that were forwarded from the source base station 11a (step 210) preferentially to the mobile unit 14 via transmission/reception unit 23. However, when forwarding is delayed and it is necessary to perform jump transmission of packets, the scheduler unit 22 executes jump transmission of packets that are received from the host station 12. In order to execute jump transmission, the scheduler unit 22 sets the type number of the type field in the header of the packets for which jump transmission will be performed to 010 (type=010), thereby the mobile station 14 will be able to identify that the packets are jump packets (step 211). After that, the transmission/reception unit 23 sends the jump packets to the mobile station.

At the same time as this, the handover control unit 24b sends a resource release to the source base station 11a (step 212), then returns to step 501 to check whether the Waiting Time has ended, and when the Waiting Time has not ended, repeats the process from step 209.

On the other hand, in step 501, when the Waiting Time $T_W$ has ended, the scheduler unit 22 sets the type number of the packet that will be transmitted immediately after the Waiting Time has ended to '011'. In other words, the scheduler unit 22 adds a last packet ID code L to the packet that will be transmitted immediately after the Waiting Time ends, and transmits that packet (Last packet) to the mobile station 14 (steps 502 and 503), then after that, performs post processing and ends handover control (steps 212 and 213).

In step 502, in order to be able to identify whether the last packet to which the last packet ID code L has been added is a packet that has been forwarded from the source base station 11a, or is a packet that was received from the host station 12, the scheduler unit 22 sets the type number to '011' in the case of the former, and sets the type number to '100' in the case of the latter. By doing this, it becomes easy for the mobile station 14 to perform the reordering process as will be described later.

Operation of the Mobile Station

Figure 16:
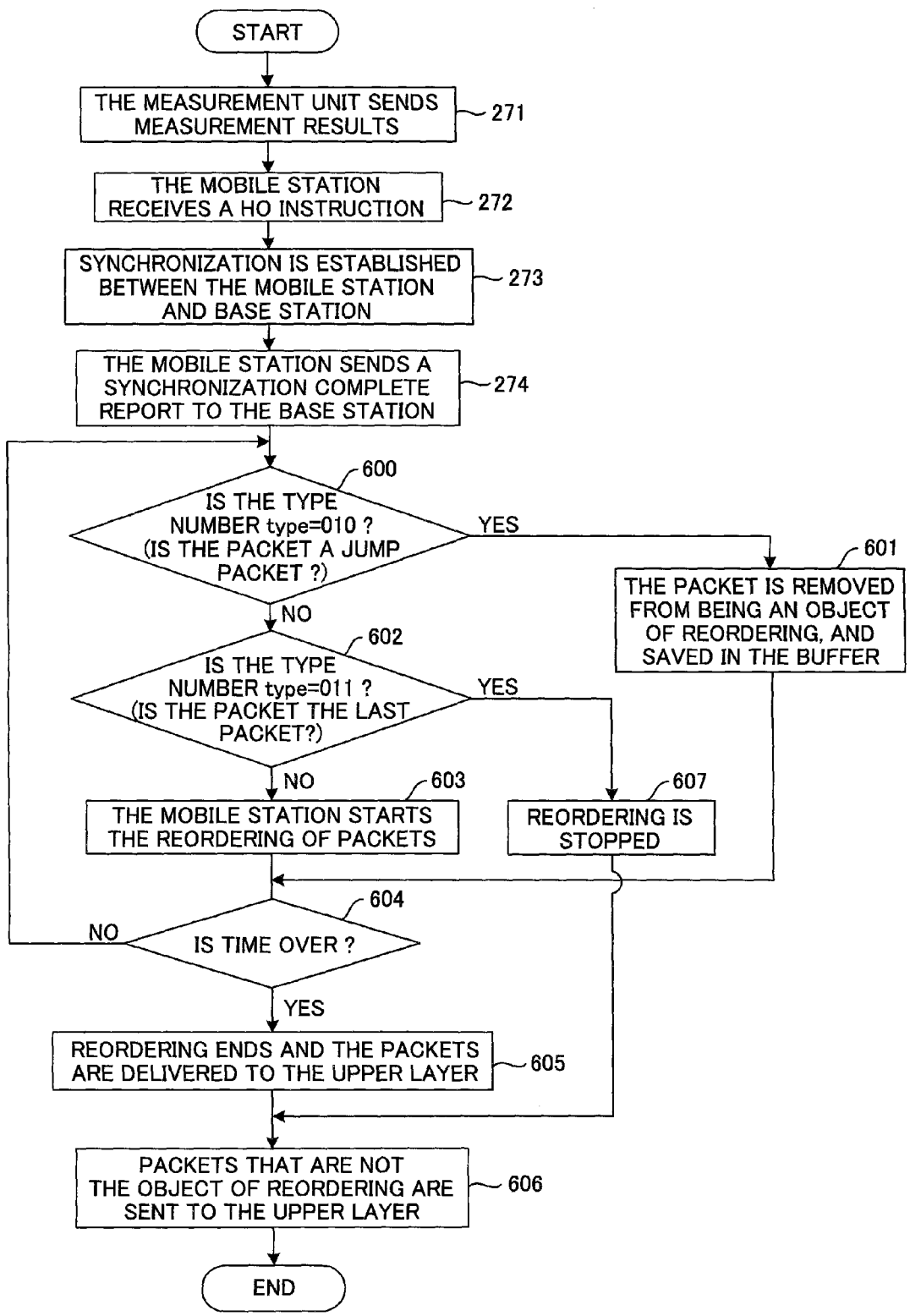
FIG. 16 is a flowchart of the operation of a mobile station in a second embodiment of the invention.

FIG. 16 is a flowchart showing the operation of the mobile station, where the same reference numbers are used for steps that are the same those in the operation flowchart shown in FIG. 98. The measurement unit 34a of the mobile station 14 uses a Measurement Report to notify the source base station 11a of the reception status. The control unit 34 then waits for a HO instruction message to be sent from the source base station 11a, and after receiving the HO instruction message, establishes synchronization between the mobile station 14 and the target base station 11b using L1/L2 signaling, and after synchronization has been established, sends a handover complete report to the target base station 11b (steps 271 to 274).

After that, the control unit 34 checks whether a received packet is a jump packet, or in other words, a packet having a type number type=010 (sep 600), and when the packet is a jump packet, removes that packet from being an object of reordering and saves it in the buffer 32 (step 601).

On the other hand, when the packet is not a jump packet, the control unit 34 checks whether the received packet is the Last packet, or in other words, a packet having a type number type=011 (sep 602). In the case where the packet is not the Last packet, the control unit 34 starts the reordering process, and arranges the PDCP PDU packets according to sequence numbers, then creates PDCP SDU data and delivers that data to the upper layer (step 603).

The control unit 34 then checks whether the preset time period $T_M$ has ended (step 604), and when the set time period $T_M$ has not yet ended, the control unit 34 repeats processing from step 600, and when the set time period $T_M$ has ended, the control unit 34 ends the reordering process, then deletes the header from RLC SEU (PDCP PDU) packets that have not yet been delivered to the upper layer, creates PDCP SDU data and delivers that data to the upper layer (step 605). Next, the control unit 34 delivers packets that are not the object of reordering to the upper layer and ends processing (step 606).

However, in step 602, when the received packet is the Last packet, the control unit 34 immediately stops the reordering process (step 607). At that time, in the case where the Last packet is a forwarded packet, the control unit 34 creates a PDCP SDU packet from that Last packet and delivers that packet to the upper layer, then stops reordering. When the Last packet is a packet received from the host station 12, the control unit 34 immediately stops reordering, and connects the Last packet to the last packet that is not an object of reordering and stored in the buffer. After that, the control unit 34 delivers the packets that were not the object of reordering to the upper layer and ends processing (step 606).

As described above, with this second embodiment of the invention, the mobile station detects the end of the forwarded packets by referencing the Last packet ID code, making it possible to quickly stop the reordering process. Therefore, it is possible to eliminate the data delay time, and improve the throughput of the overall system.

(D) Third Embodiment

The order information (sequence numbers n, m) that has been presented up until now has been convenient numbers for simplifying the explanation, however, actually, it is information that is added at the base station.

As was explained above, in a LTE communication system, forwarding is performed in PDCP SDU data units. Therefore, when forwarding occurred, it was not possible to send the Sequence Number field from the source base station 11a to the target base station 11b, and it was necessary to notify the target base station 11b of the sequence numbers using some method.

In this embodiment, the source base station 11a notifies the target base station 11b of the sequence numbers together with the PDCP SDU data, and based on those sequence numbers, the target base station 11b adds a header including the sequence numbers to the forwarded PDCP SDU data (packets) thereby PDCP PDU(RLC SDU) packet is created.

Figure 17:
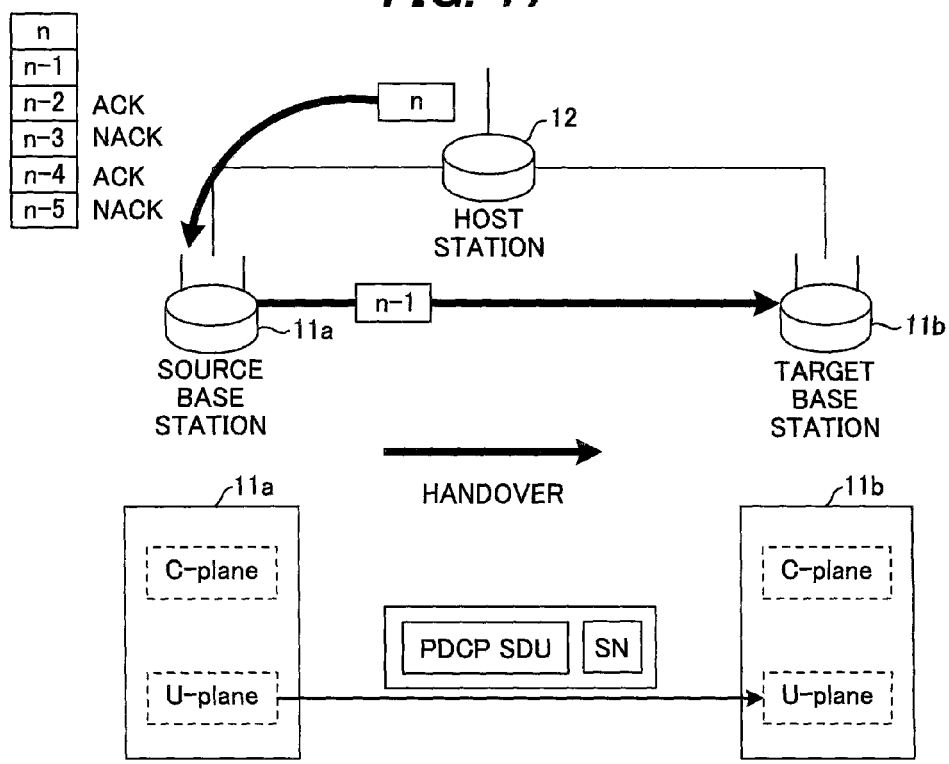
FIG. 17 shows an example of attaching PDCP PDU sequence numbers SN to PDCP SDU data and performing notification via the data plane (U-plane).

FIG. 17 is an example of sending the PDCP PDU sequence number together with the PDCP SDU data (packets) via the data plane (U-plane). In FIG. 17, only the PDCP SDU data and the sequence numbers that accompany that data are shown, however, in order that the PDCP SDU data is recognized to be a bunch of packets, control information (header information) must be added. Each time the source base station 11a forwards PDCP SDU data, the source base station 11a notifies the target base station 11b of the sequence number that accompanies that PDCP SDU data using the format shown in FIG. 17, and based on that sequence number, the target base station 11b adds the sequence number to the forwarded PDCP SDU data (packet).

In other words, in the condition shown in FIG. 17, the source base station 11a first forwards sequence number n−5 and the first PDCP SDU data via the data plane U-plane. Next, the source base station 11a forwards sequence number n−3 and the next PDCP SDU data via the data plane U-plane. After that, when forwarding following PDCP SDU data that were received from the host station 12, the source base station 11a similarly forwards the PDCP SDU data and the sequence numbers n−1 and n thereof to the target base station 11b via the U-plane. At the target base station 11b, by receiving the sequence numbers n−5, n−3, n−1 and n that were notified via the U-plane, it is possible for the target base station 11b to recognize the numbers as the sequence numbers for the forwarded data.

Figure 18:
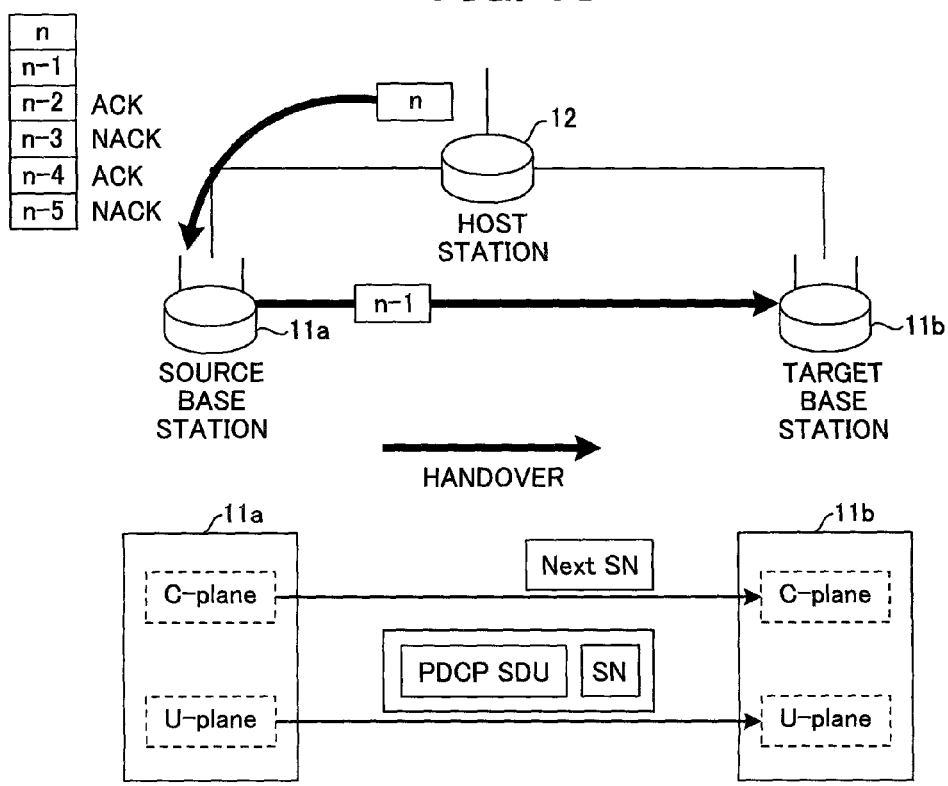
FIG. 18 shows an example of attaching PDCP PDU sequence numbers SN to PDCP SDU data and performing notification via the U-plane, as well as performing notification of sequence numbers via the C-plane.
Figure 19:
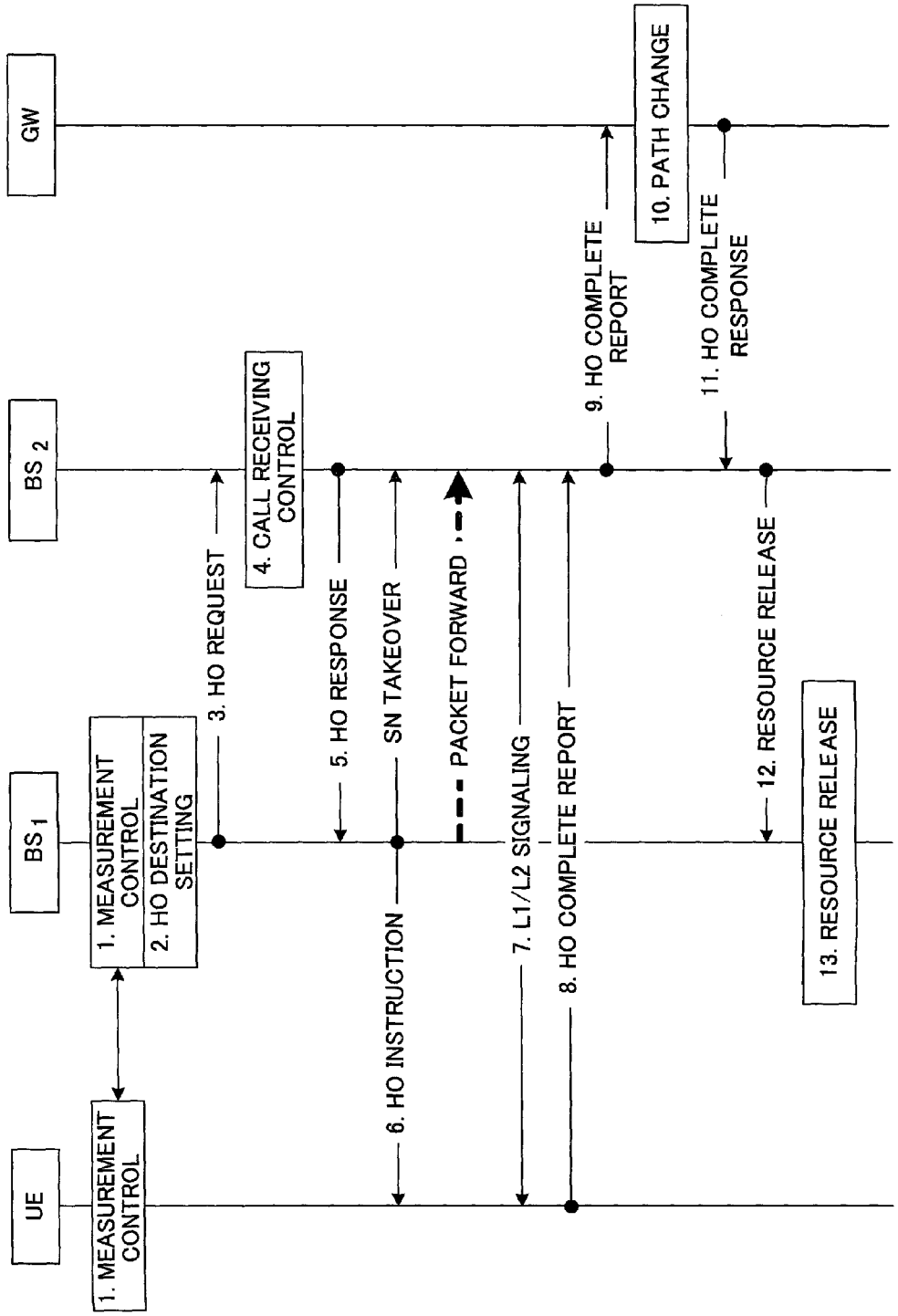
FIG. 19 is a drawing showing the procedure of the handover sequence in FIG. 18.

FIG. 18 is an example of the source base station 11a notifying the target base station 11b via the U-plane of the PDCP PDU sequence number together with the appropriate PDCP SDU data, and notifying the target base station 11b via the C-plane of the sequence number of PDCP SDU data, for which right reception by the mobile station could not be confirmed, as the Next SN. Notification of the sequence number (Next SN) via this C-plane is shown as taking over of the SN (SN takeover) in the handover sequence shown in FIG. 19. It may possible to perform SN taking over at the same time that the source base station 11a sends a HO request to the target base station 11b.

In the state shown in FIG. 18, the source base station 11a first forwards the sequence number n−5 and the first PDCP SDU data via the U-plane. Also, at the same time, the source base station 11a notifies the target base station via the C-plane of the just the sequence number n−5 of the PDCP SDU data, for which proper reception by the mobile station could not be confirmed, as the Next SN (SN takeover). Next, the source base station 11a forwards the sequence number n−3 and the next PDCP SDU data via the U-plane. After that, when forwarding the PDCP SDU data that was received from the host station 12, the source base station 11a similarly forwards that PDCP SDU data and the sequence number n−1, n thereof to the target base station 11b via the U-plane. The target base station 11b receives the sequence number n−5 that was notified via the C-plane, and the sequence numbers n−5, n−3, n−1 and n that were notified via the U-plane, however, since the sequence numbers that were notified via the U-plane are larger than the sequence number notified via the C-plane, the target base station 11b adds the sequence numbers that were notified via the U-plane to the following PDCP SDU data received via the U-plane, and transmits the data to the mobile station. In other words, the target base station 11b ignores the sequence number n−5 that was notified via the C-plane.

Figure 20:
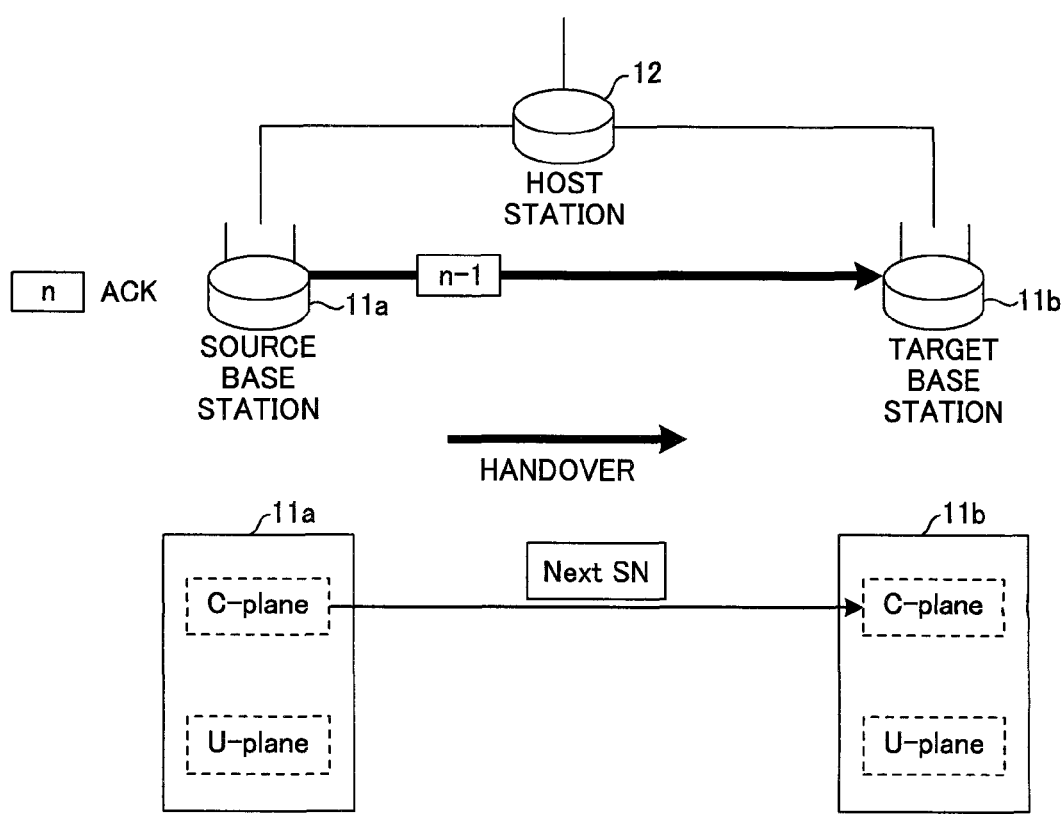
FIG. 20 shows an example when there is absolutely no PDCP PDU data to forward.
Figure 21:
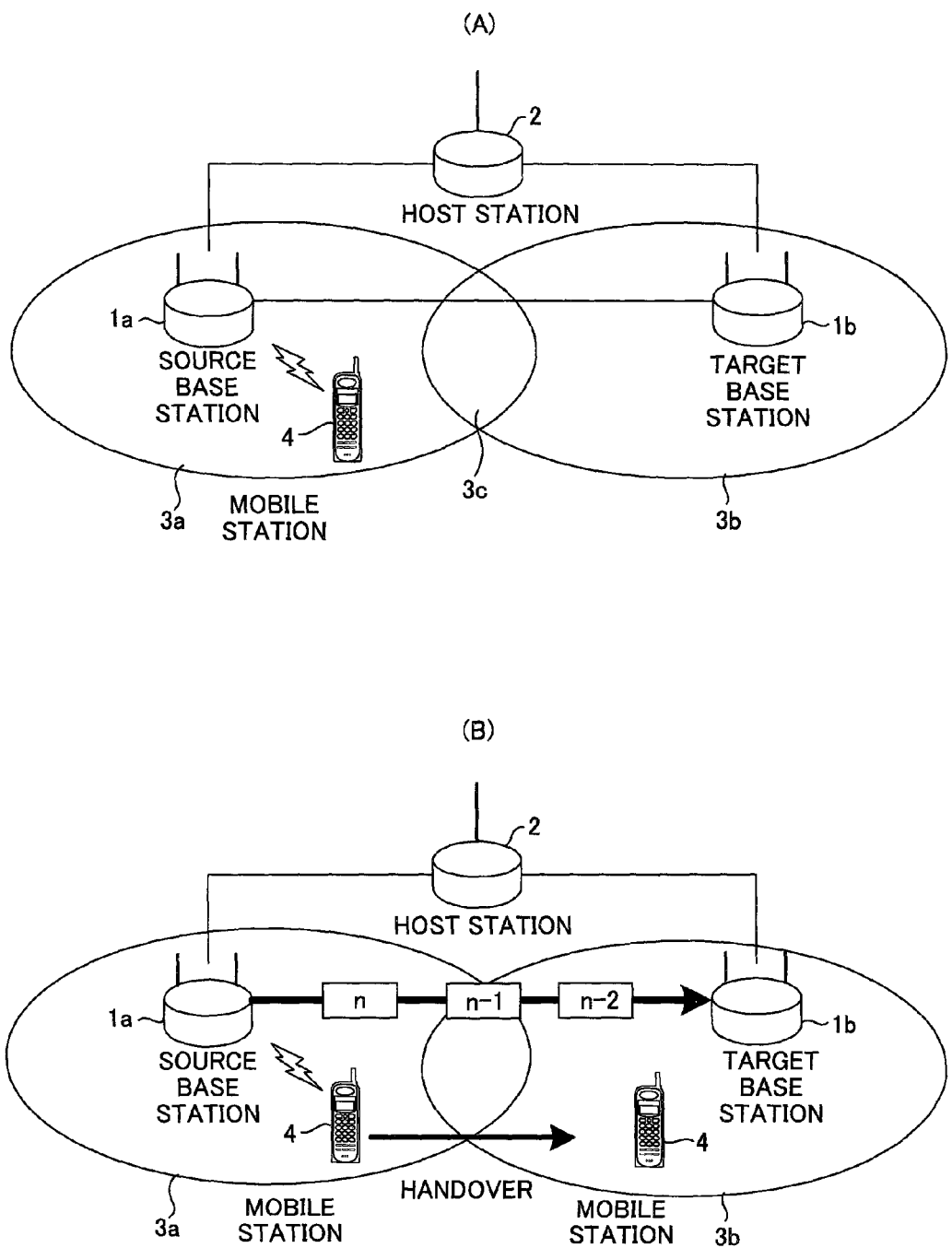
FIG. 21 is a drawing explaining the takeover of communication during a handover.
Figure 22:
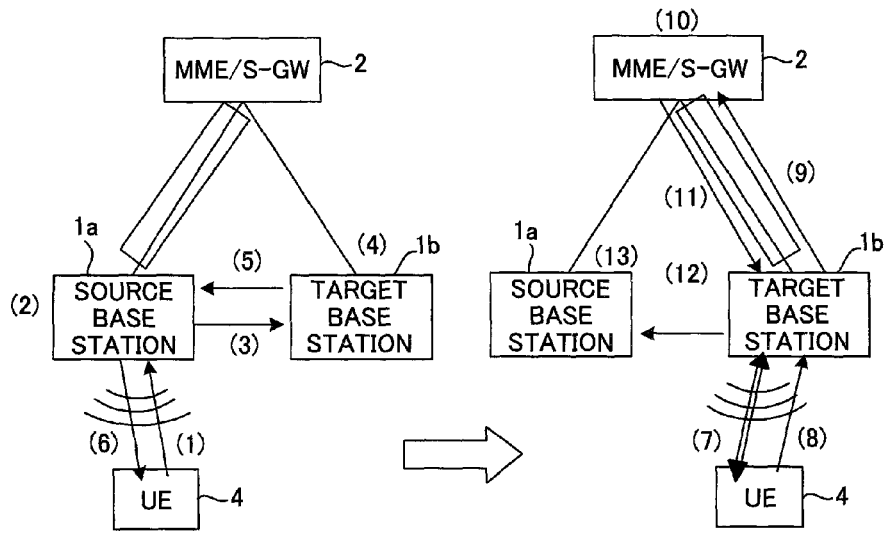
FIG. 22 is a drawing explaining a handover in a LTE communication system.

FIG. 20 is an example of the case in which there is no PDCP SDU data to forward.

The source base station 11a notifies the target base station 11b via the C-plane of the next sequence number n+1, as the Next SN. When the Waiting Time ends without the target base station 11b receiving PDCP SDU data from the source base station 11a, the target base station 11b adds the sequence number to the following PDCP SDU data based on the sequence number n+1 that was notified via the C-plane, and transmits the data to the mobile station. In other words, the source base station 11b sets the sequence number of the packet m that was received from the host station to n+1 and transmits that data to the mobile station.

Advantage of the Present Invention

With the present invention described above, it is possible to quickly send packets that were sent from host station to the target base station to the mobile station as jump packets, thus making it possible to eliminate the delay time of data, and to improve the throughput of the overall system. Moreover, the mobile station removes jump packets from being the object of reordering control (sequence order control), and performs order sequence control only on packets other than jump packets, then delivers the packets to a higher apparatus (upper layer) in order of sequence numbers. As a result, the mobile station is able to properly perform sequence order control of packets that are the object of reordering even when there is only one sequence order function.

Furthermore, with the present invention, the mobile station detects the end of the forwarded packets by referencing last packet ID code, and so is able to quickly stop reordering. Therefore, it is possible to eliminate the delay time of data, and to improve the throughput of the overall system.

What is claimed is:

1. A data delivery method of sending data and a sequence number corresponding to the data from a base station to a mobile station, and performing in order delivery of the data received by the mobile station based on the sequence number; comprising:

differentiating, at a source base station, a first sequence number added to data that is transmitted to the mobile station from the source base station from a second sequence number added to data that is transmitted to the mobile station from a host station via a target base station and notifying the second sequence number to the target base station;

adding, at the target base station, the second sequence number notified from the source base station to the data that is received from the host station and transmitting the data to which the second sequence number is added to the mobile station from the target base station; and at the mobile station, performing in order delivery of the data received from the source base station and the data received from the target base station using the sequence numbers.

2. A communication system for sending data and a sequence number corresponding to the data from a base station to a mobile station, and performing in order delivery of the data received by the mobile station based on the sequence number; comprising:
　　a source base station; and
　　a target base station wherein
　　the source base station includes a processor that differentiates a first sequence number added to data that is transmitted to the mobile station from the source base station from a second sequence number added to data that is transmitted to the mobile station from a host station via the target base station and notifying the second sequence number to the target base station;
　　wherein the target base station includes a processor that adds the second sequence number notified from the source base station to the data that is received from the host station and a transmitter that transmits the data to which the second sequence number is added to the mobile station; and
　　the mobile station includes a data delivery processor that performs in order delivery of the data received from the source base station and the data received from the target base station using the sequence numbers.

3. A mobile station, comprising:
a receiver that receives a first sequence number with data from a source base station and receives a second sequence number with data from a target base station in which the source base station differentiates the first sequence number added to the data that is transmitted to the mobile station from the source base station from the second sequence number added to data that is transmitted to the mobile station from a host station via the target base station and notifies the second sequence number to the target base station, and the target base station adds the second sequence number notified from the source base station to the data that is received from the host station and transmits the data to which the second sequence number is added to the mobile station; and
a data delivery processor that performs in order delivery of the data received from the source base station and the data received from the target base station using the sequence numbers.

4. A base station comprising:
a receiver that receives data from a host station;
a processor that adds a second sequence number notified from a source base station to the data that is transmitted from the host station and received by the receiver in which the source base station differentiates a first sequence number added to data that is transmitted to a mobile station from the source base station from the second sequence number added to the data that is transmitted and received by the receiver and notifies the second sequence number to a target base station; and
a transmitter that transmits the data to which the second sequence number is added to the mobile station.

* * * * *